US008593407B2

(12) United States Patent  
Lu et al.

(10) Patent No.: US 8,593,407 B2
(45) Date of Patent: Nov. 26, 2013

(54) ELECTRONIC DEVICE SYSTEM UTILIZING A CHARACTER INPUT METHOD

(71) Applicant: Gold Charm Limited, Apia (WS)

(72) Inventors: Chi-Chang Lu, New Taipei (TW); Chen-Hong Chao, New Taipei (TW)

(73) Assignee: Gold Charm Limited, Apia (WS)

( * ) Notice: Subject to any disclaimer, the term of this patent is extended or adjusted under 35 U.S.C. 154(b) by 0 days.

(21) Appl. No.: 13/625,906

(22) Filed: Sep. 25, 2012

(65) Prior Publication Data

US 2013/0021253 A1   Jan. 24, 2013

Related U.S. Application Data

(62) Division of application No. 12/432,734, filed on Apr. 29, 2009, now Pat. No. 8,300,016.

(30) Foreign Application Priority Data

May 2, 2008 (TW) .............................. 97116277 A

(51) Int. Cl.
*G06F 3/041* (2006.01)
(52) U.S. Cl.
USPC ........... 345/168; 345/156; 345/173; 345/184; 715/773; 715/810; 715/816; 715/817; 715/840; 715/864

(58) Field of Classification Search
USPC .......... 345/156–158, 168–178, 184; 715/773, 715/810, 816, 817, 840, 864
See application file for complete search history.

(56) References Cited

U.S. PATENT DOCUMENTS 6,370,363 B1 *   4/2002   Fukuzato .................... 455/90.1

* cited by examiner

*Primary Examiner* — Kevin M Nguyen
*Assistant Examiner* — Cory Almeida
(74) *Attorney, Agent, or Firm* — Altis & Wispro Law Group, Inc.

(57) ABSTRACT

A character input method is implemented in a device with a plurality of keys. If a key is activated by a first operation matching a first input pattern, a first route is selected to traverse a plurality of characters corresponded by the key during presentation of the plurality of characters. If the first key is activated by a second operation matching a second input pattern, the plurality of characters corresponded by the first key are orderly retrieved and presented according to a second route in response to operations on the first key. The order for presenting two characters corresponded by the first key in the first route is reversed in the second route.

37 Claims, 23 Drawing Sheets

ELECTRONIC DEVICE SYSTEM UTILIZING A CHARACTER INPUT METHOD

CROSS-REFERENCE TO RELATED APPLICATIONS

This application is a divisional of U.S. application Ser. No. 12/432,734, entitled "ELECTRONIC DEVICE SYSTEM UTILIZING A CHARACTER INPUT METHOD", filed on Apr. 29, 2009, published as US20090273566A1, which is based upon and claims the benefit of priority from Taiwan Patent Application No. 097116277, filed May 2, 2008. The entirety of each of the above-mentioned patent applications is hereby incorporated by reference herein in its entirety.

BACKGROUND

1. Technical Field

The present invention relates to computer techniques, and more particularly to electronic device systems utilizing modified character input methods.

2. Description of Related Art

A cell phone is not very convenient for text input since it is typically equipped with a numeric keypad rather than an alphanumeric keyboard. For example, because 26 letters are mapped to 8 numeric keys means that one numeric key would have to represent three to four letters.

In an existing input method, one keystroke on a key representing "A", "B", and "C" can be recognized as to present a character candidate "A", two keystrokes to present "B", and three keystroke to present "C". Inputting character "C" is always more complex and difficult than "A" and liable to lead to mistakes. For example, inputting "C" requires repeatedly and rapidly pressing a specific key three times, during which "A", "B", and "C" are orderly presented. An additional key press causes the desired "C" to be missed and leads to reiteration of "A", "B", and "C", which is very troublesome and time consuming.

DETAILED DESCRIPTION

Description of exemplary embodiments of a character input method and an electronic device utilizing the same is given in the following paragraphs which are organized as:

1. System Overview
2. Exemplary Embodiments of Character Input Methods
    2.1 First Exemplary Embodiment of Character Input Method
    2.2 Second Exemplary Embodiment of Character Input Method
    2.3 Third Exemplary Embodiment of Character Input Method
3. Variation of Embodiments
    3.1 Alternative Embodiments of Character Input Method
    3.2 Alternative Embodiments of the Electronic Device
4. Conclusion 1. System Overview The character input method can be implemented in various electronic devices, such as cell phones, personal digital assistants (PDAs), set-top boxes (STB), televisions, or media players. An example of an electronic device implementing the character input method is given in the following.

Figure 1:
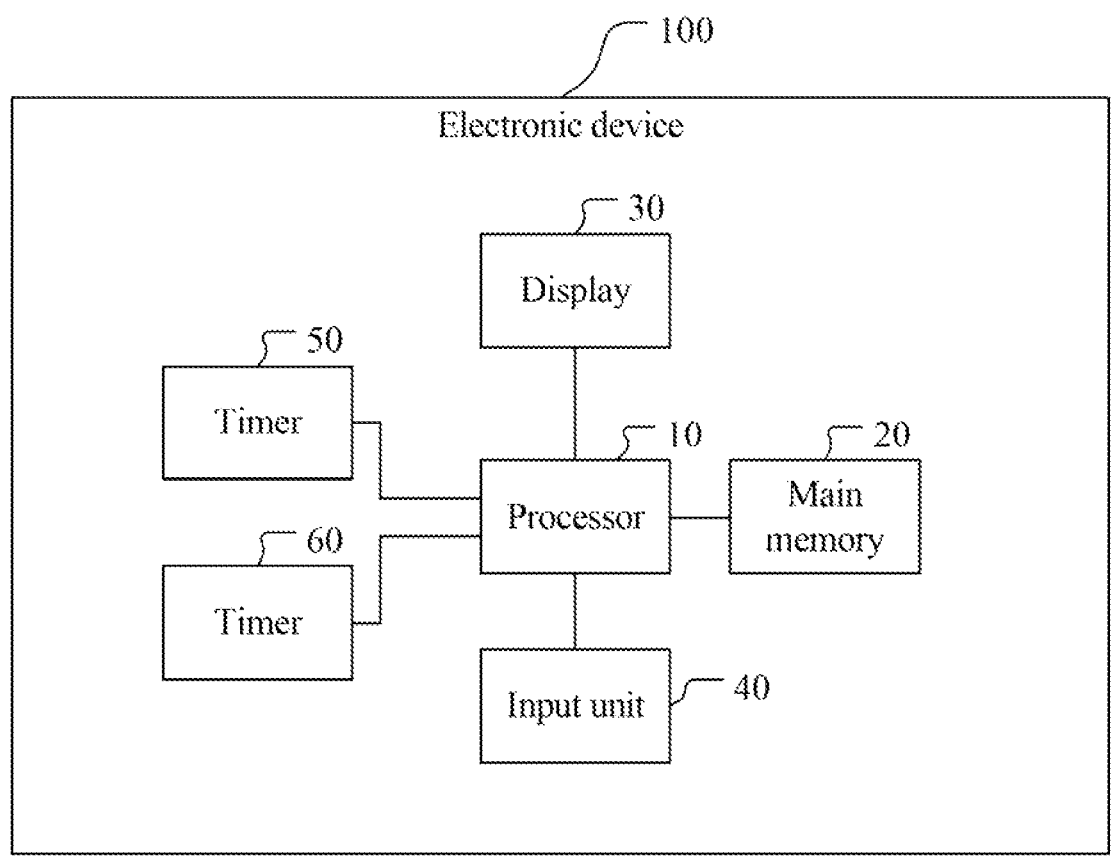
FIG. 1 is a block diagram of an embodiment of an electronic device.
Figure 10:
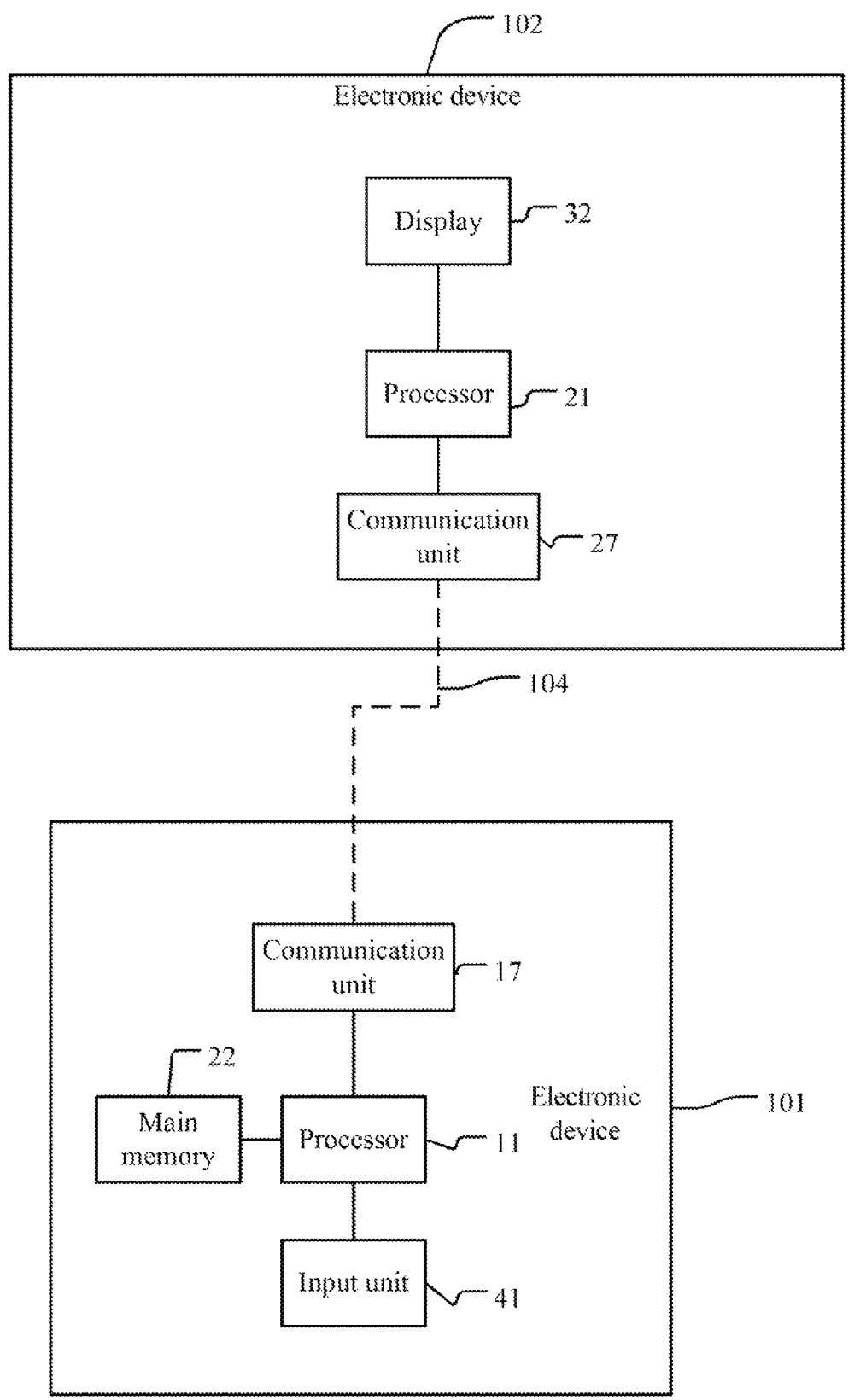
FIG. 10 is a block diagram of an embodiment of an electronic device system in which an electronic device with a input device and an electronic device with a display transfer text to each other through a communication channel.
Figure 11:
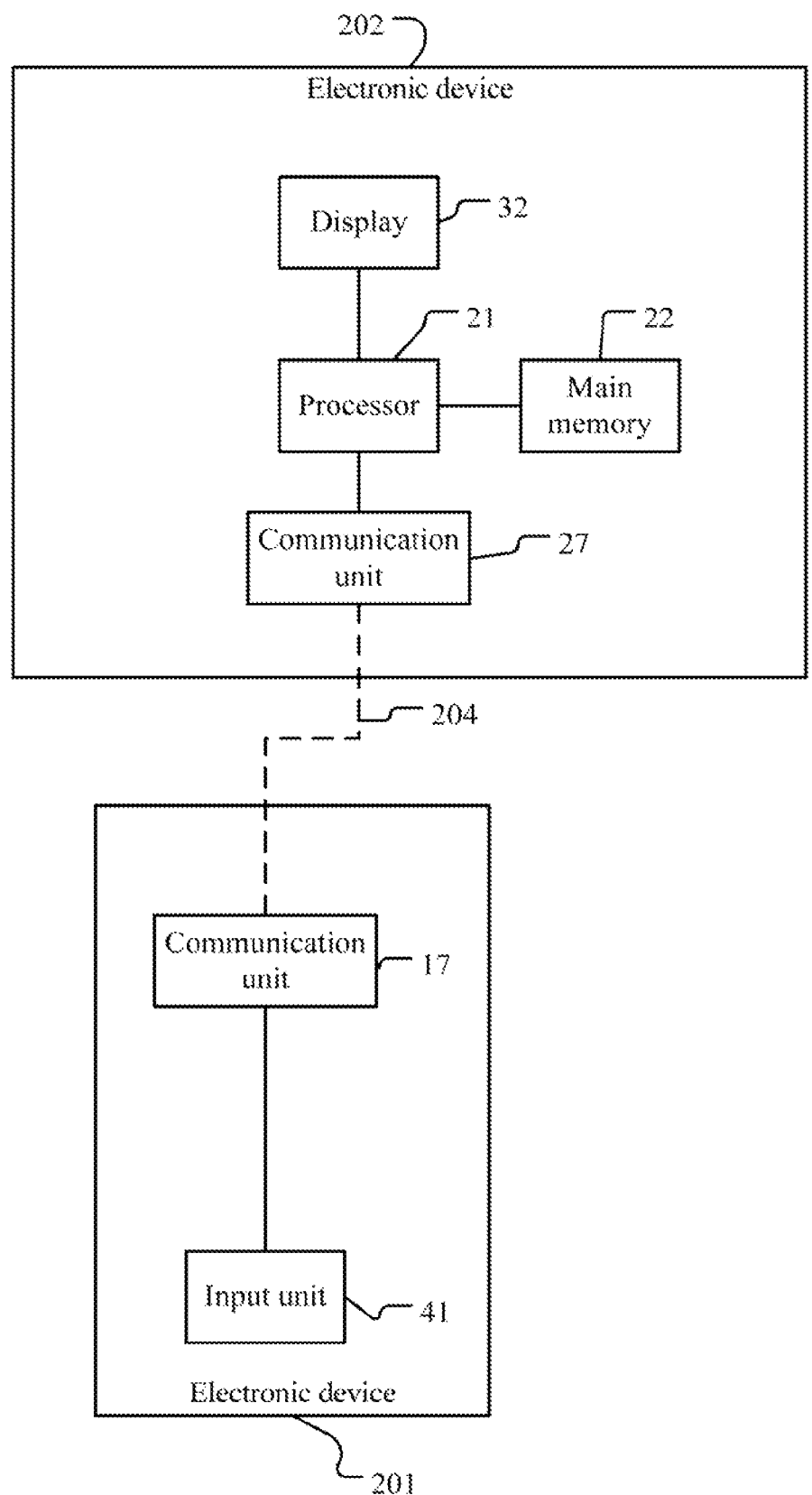
FIG. 11 is a block diagram of another embodiment of the electronic device system in which an electronic device with a display receives control signals for text input through a communication channel from an external source.
Figure 12:
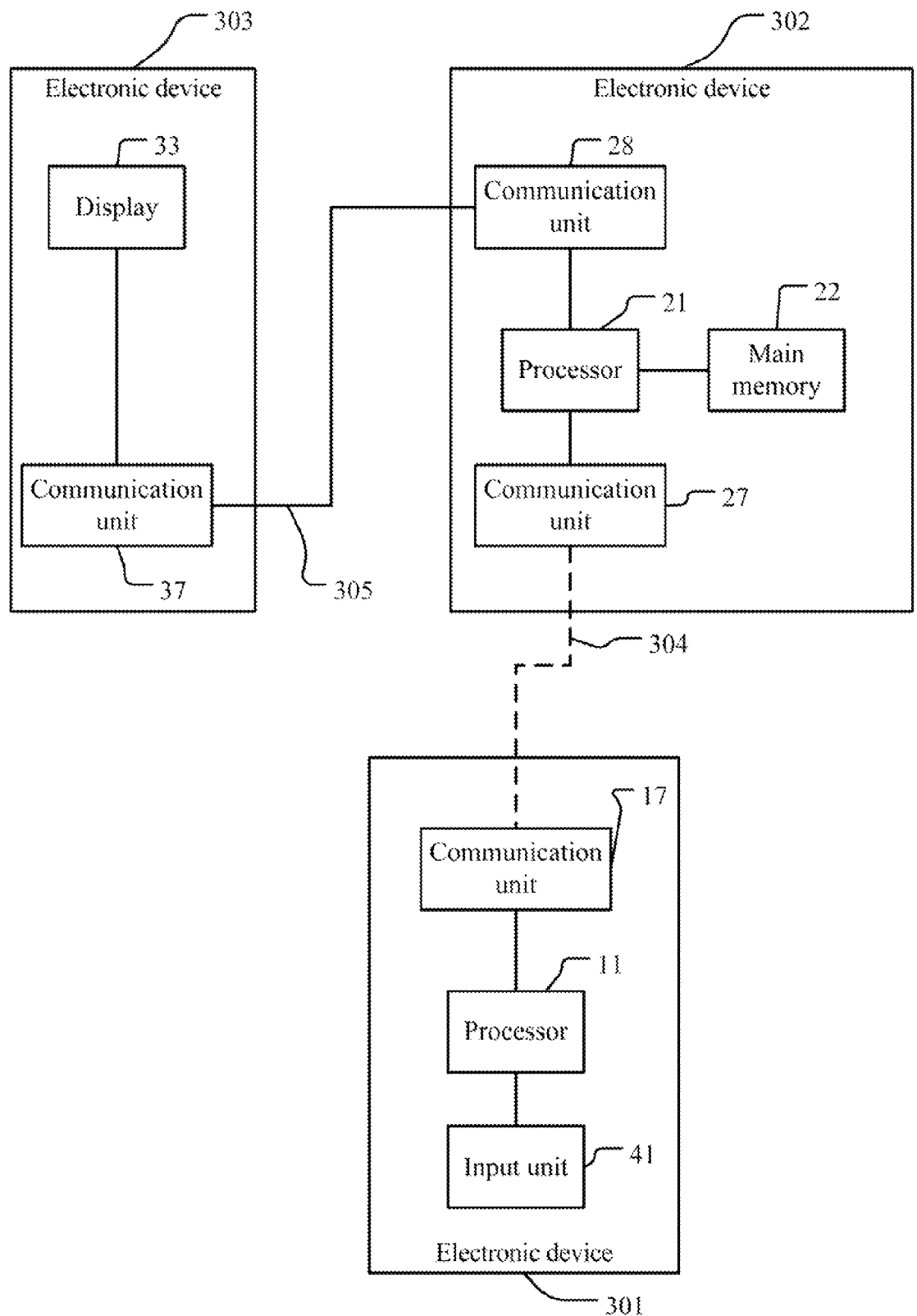
FIG. 12 is a block diagram of another embodiment of the electronic device system in which three electronic devices transfer control signals for text input and text presentation through a communication channel.

With reference to FIG. 1, an electronic device 100 comprises a processor 10, a main memory 20, a display 30, an input unit 40, and timers 50 and 60. The processor 10 may comprise various integrated circuits (ICs) for processing data and machine-readable instructions. The processor 10 may be packaged as a chip or comprise a plurality of interconnected chips. For example, the processor 10 may only comprise a central processing unit (CPU) or a combination of a CPU, a digital signal processor (DSP), and a chip of a communication controller, such as communication units in FIG. 10-12. The communication controller coordinates communication among components of the electronic device 100 or communication between the electronic device 100 and external devices. Examples of such communication controller, such as communication units in FIG. 10-12, are detailed in the paragraphs of alternative embodiments. The main memory 20 may comprise a random access memory (RAM), a nonvolatile memory, a mass storage device (such as a hard disk drive), or a combination thereof. The nonvolatile memory may comprise electrically erasable programmable read-only memory (EEPROM) and flash memory. The display 30 is configured for displaying text and image, and may comprise e-paper, a display made up of organic light emitting diode (OLED), or a liquid crystal display (LCD). The display 30 may display various graphical user interfaces including text area. The display 30 may comprise a single display or a plurality of displays in different sizes.

The input unit 40 may comprise various input devices to input data or signals to the electronic device 100, such as a touch panel, a touch screen, a keyboard, or a microphone. The timers 50 and 60 keeping predetermined time intervals may comprise circuits, machine-readable programs, or a combination thereof. Each of the timers 50 and 60 generates signals to notify expiration of the predetermined time intervals. Components of the device 100 can be connected through wire-lined or wireless communication channels.

Figure 2:
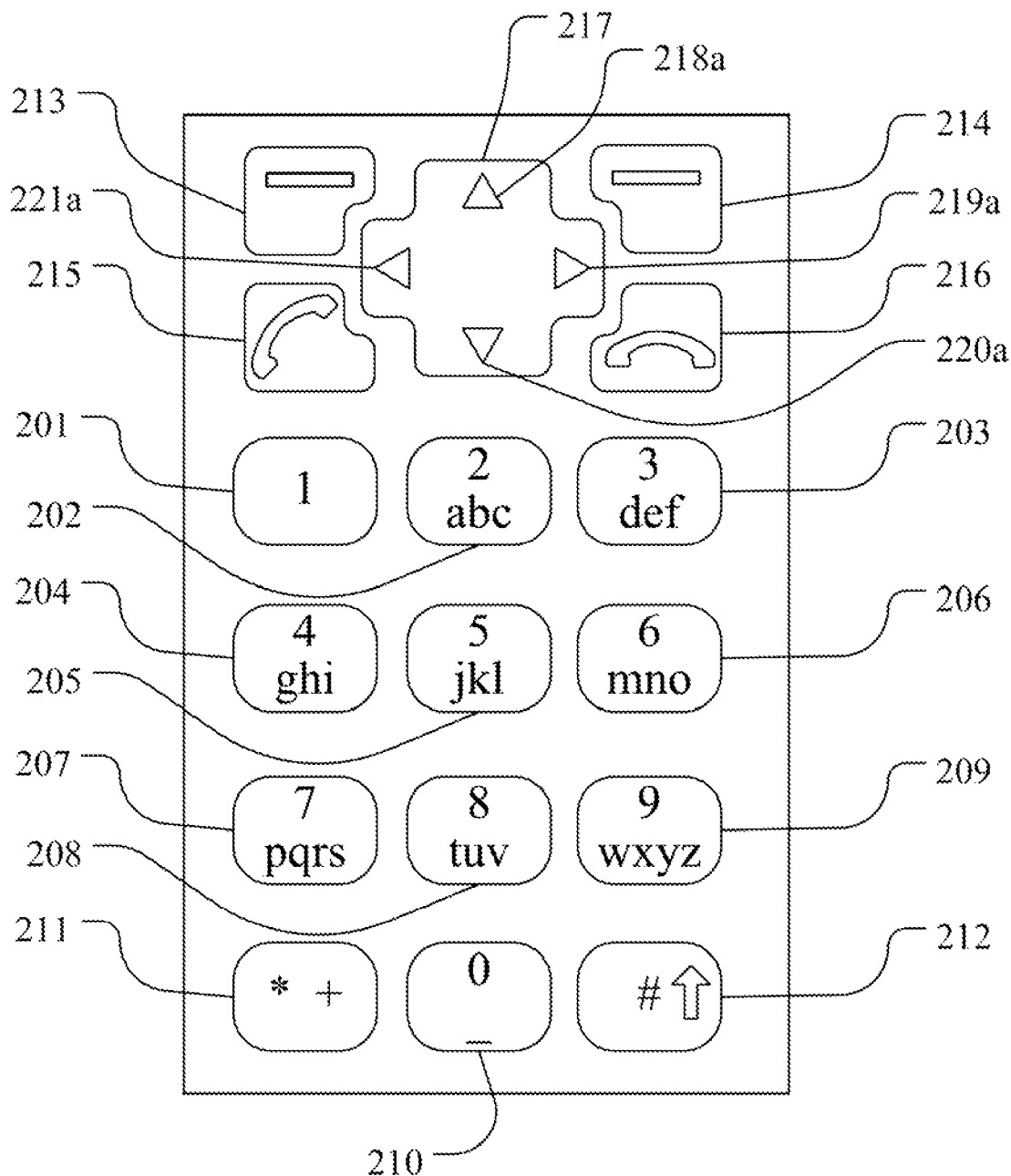
FIG. 2 is a schematic diagram of an exemplary embodiment of a keyboard.

A keyboard in FIG. 2 is an exemplary embodiment of the input unit 40. The keyboard may be made of mechanical structures or comprise a virtual keyboard shown on the display 30. The keyboard comprises keys 201-217. Keys 213 and 214 are function keys for triggering functions based on software programs executed by the electronic device 100. A key 215 is an off-hook key, and a key 216 is an on-hook key. A key 217 is configured for directing direction and movement of a cursor on the display 30. Digits, letters, and/or symbols corresponding to the keys 201-212 are shown on respective keys in FIG. 2, but are not intended to be limited thereto. Digits, characters, and/or symbols corresponding to and represented by a key may be referred to as candidates of the key. For example, the key 201 corresponds to digit "1," the key 202 corresponds to digit "2" and characters "a", "b", and "c", and the key 203 corresponds to digit "3" and characters "d", "e", and "f". The key 210 corresponds to digit "0" and a space character; the key 212 corresponds to symbol "#" and a function for switching input methods. Different input methods differ in the ways of candidate character selection. As one of different input methods can be selectively activated, each key may accordingly correspond to different sets of characters. For example, the key 212 of the electronic device 100 may activate so called abc input method or T9® text input method developed by Tegic Communications, Inc. The electronic device 100 may be installed with a plurality of character input methods that are user-selectable.

2. Exemplary Embodiments of Character Input Methods

Figure 3A:
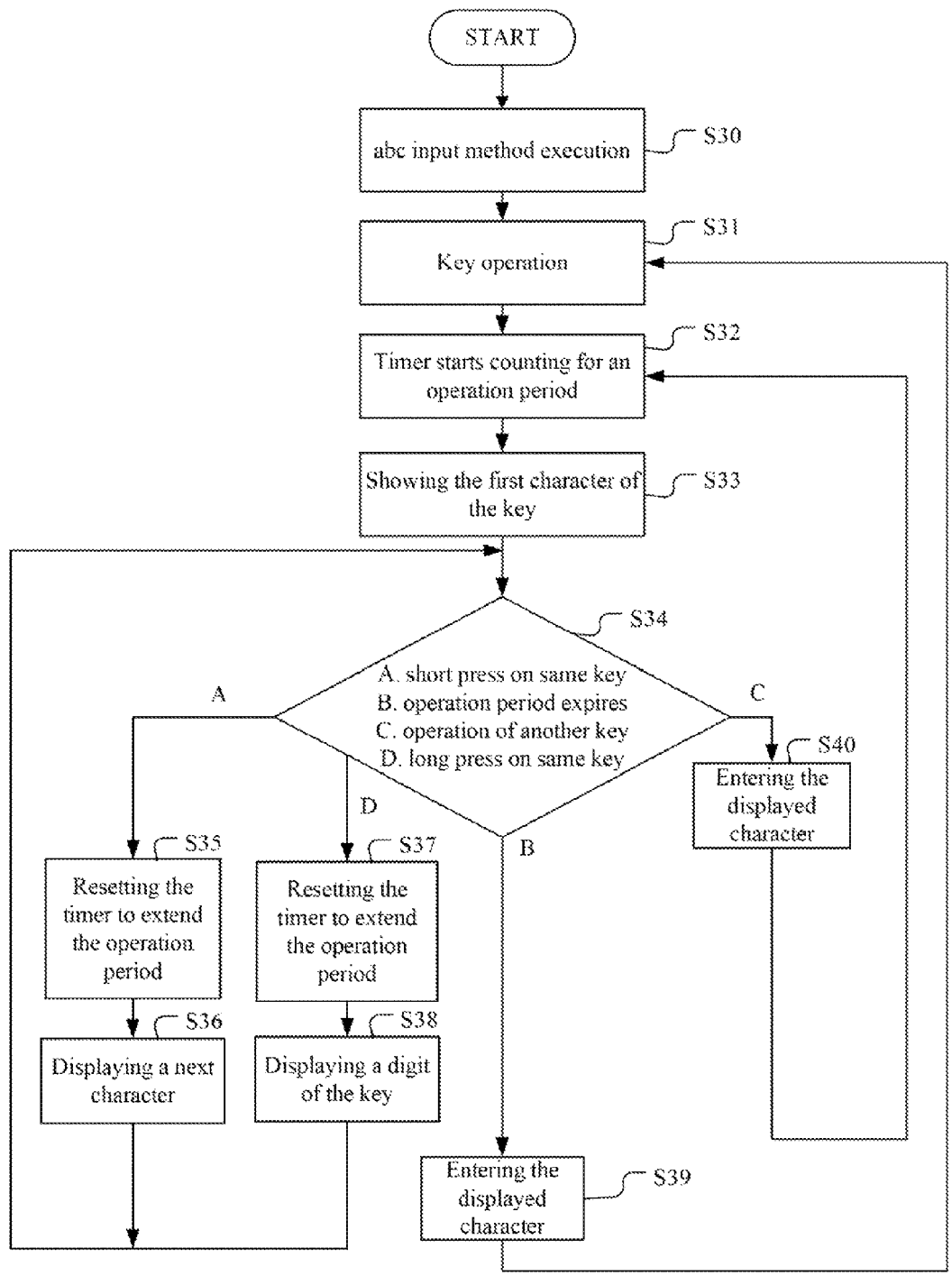
FIG. 3A is flowchart showing one embodiment of an abc input method.

FIG. 3A shows a flowchart of one embodiment of the abc input method. First, the processor 10 initializes the abc input method (step S30) and determines if any key is activated (step S31). If at least a key is activated, the processor 10 initiates a timer to keep an operation period of the activated key (step S32), and displays a first character candidate for the activated key (step S33). For example, if the key 208 is activated at the step S31, the processor 10 displays the first character candidate "t" for the activated key 208 at the step S33. In the step S34, the processor 10 continues to detect any short press on the same activated key (event A), expiration of the operation period (event B), any operation of another key (event C), or any long press on the same activated key (event D).

Upon receiving a short press on the same activated key (event A), the processor 10 resets the timer to renew counting of the operation period (step S35), and displays a next character candidate of the activated key (step S36). For example, if the key 208 is activated by a short press operation at the step S34, the processor 10 displays a next character candidate "u" for the activated key 208 at the step S36. Timer resetting can extend the operation period.

If the operation period expires (event B), the processor 10 enters a currently displayed character candidate to a text area of the display 30 of the electronic device 100 (step S39). Focusing may be applied to the currently displayed character candidate of the activated key currently displayed on the text area as a result of character candidate traversal. In one embodiment, the focusing may include enlargement of the currently displayed character, and/or displaying the currently displayed character in a bold or italic font, for example.

Upon receiving an operation of another key, referred to as a key j, where j is a integer variable (event C), the processor 10 enters the currently displayed character candidate in a text area of the electronic device 100 (step S40), returns to the step S32 to initiate an operation period of the key j, and returns to the step S33 to display a first character candidate of the key j. The processor 10 accordingly performs steps S34-S40 following the step S33 for the key j.

Upon receiving a long press operation on the same activated key (event D), the processor resets the timer (step S37) and displays a digit corresponding to the activated key (step S38). For example, if a long press operation is performed on the key 208 at the step S34, the processor 10 displays a digit "8" for the activated key 208 at the step S38.

Figure 3B:
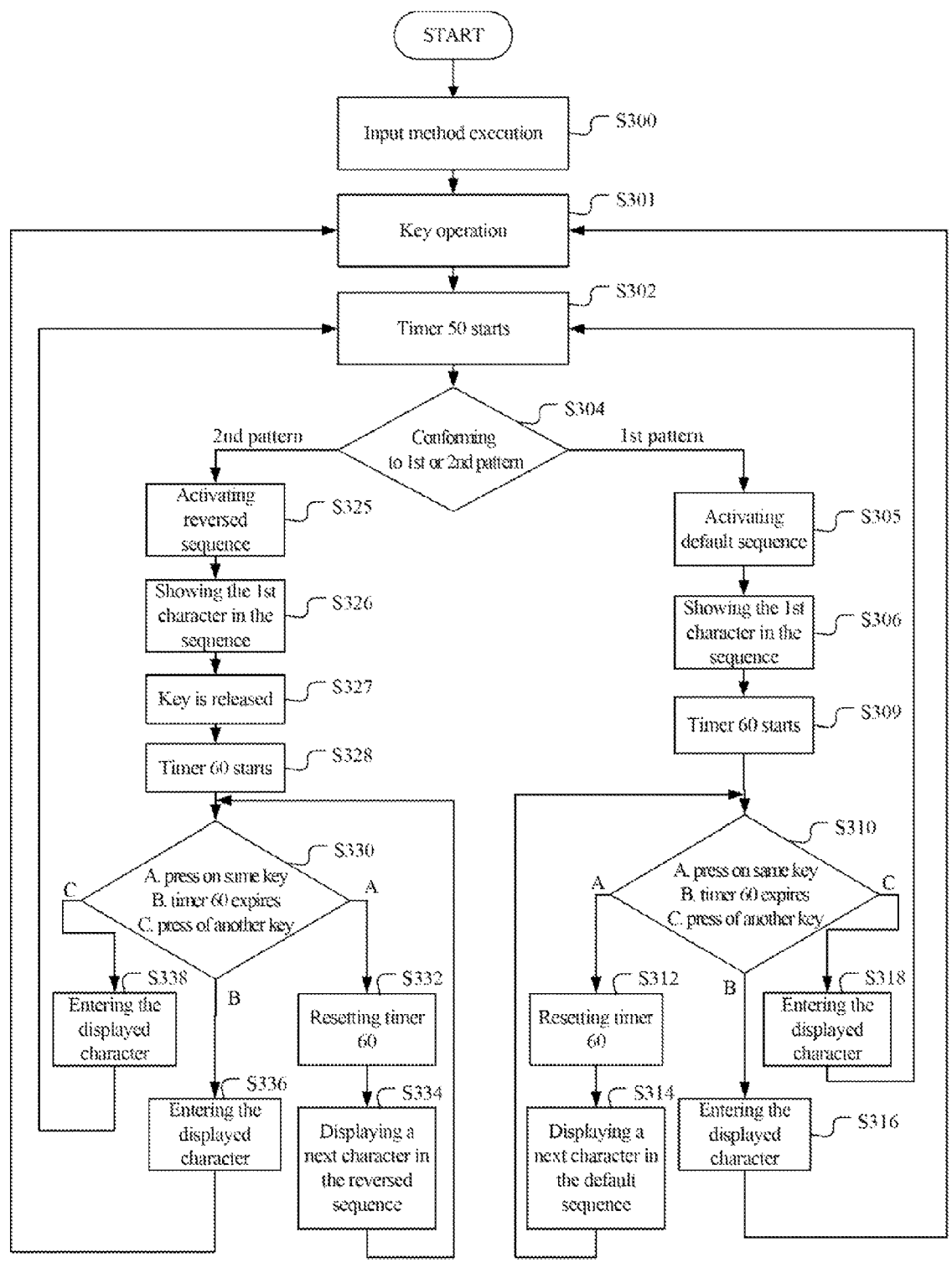
FIG. 3B is flowchart showing an exemplary embodiment of a character input method.

The electronic device 100 may be installed a plurality of character input methods and selects one of the input methods to execute. An exemplary embodiment of character input method executable by the electronic device 100 is shown in FIG. 3B. The embodiment of character input method activates different sequences of character candidates in response to different input operations on the same key without requiring switching between input methods.

2.1 First Exemplary Embodiment of Character Input Method

With reference to FIG. 3B, the processor 10 initiates a character input method (step S300) and determines if any operation is performed on a key of the input unit 40 (step S301). If an operation is performed on a key, the processor 10 initiates the timer 50 to keep a time interval for comparison with duration of the operation on the key (step S302), and determines if the operation conforms to a first input pattern or a second input pattern (step S304). The first and second input patterns may vary by electronic device design. For example, the processor 10 may identify different input operations by identifying a time interval t counted by the timer 50. For example, the processor determines that each key operation with a duration thereof less than the time interval t conforms to the first input pattern, referred to as a short press, and each key operation with a duration thereof greater than the time interval t conforms to the second input pattern, referred to as a long press. Duration of a key operation is counted from a depression of a key to releasing of the key. In other words, the processor determines that a key operation terminating before expiration of the timer 50 conforms to the first input pattern, and a key operation terminating after expiration of the timer 50 conforms to the second input pattern. The time interval t or duration of key operations may be measured in clock cycles or seconds. The time interval t may be defined as 0.5 seconds, 0.8 seconds, or 1 second, for example.

Figure 4:
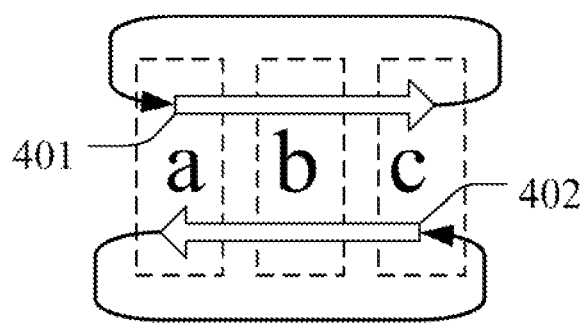
FIG. 4 shows a schematic diagram of a default direction and a reversed direction for presenting character candidates.

The key activated at step S300 is referred to as a key i, where i is a positive integer. In the example of FIG. 2, the range of i is $201 \le i \le 212$. If the performed operation conforms to the first input pattern, the processor 10 activates a default sequence of character candidates for the key i arranged in original order of the character candidates (step S305). That is, the processor 10 utilized the default sequence of the character candidates for the key i as a preset route for traversing the character candidates in presentation of the candidates, and displays one of the character candidates according to the preset route in response to each operation on the key j. With reference to FIGS. 2 and 4, the key 202 corresponds to digit "2" and characters "a", "b", and "c", a directed line 401 represents a route of traversing the character candidates of the key 202 in an original order, and a default sequence of the character candidates of the key 202 is "abc". The processor 10 may display one of the character candidates "a", "b", and "c" according to the route represented by line 401 in response to each operation on the key 202. The character candidate next to the "c" is "a", and the default sequence is iterated in presentation of the character candidates.

If the performed operation conforms to the second input pattern, the processor 10 activates a reversed sequence of character candidates for the key i arranged in a reversed order of the character candidates (step S325). That is, the processor 10 utilizes the reversed sequence of the character candidates for the key i as a preset route for traversing the character candidates in presentation of the candidates, and displays one of the character candidates according to the preset route in response to each operation on the key j. With reference to FIG. 4, a directed line 402 represents a route of traversing the character candidates of the key 202 in a reversed order, and a reversed sequence of the character candidates of the key 202 is "cba". The processor 10 displays one of the character candidates "c", "b", and "a" according to the route represented by line 402 in response to each operation on the key 202. The character candidate next to the "a" is "c", and the reversed sequence is iterated in presentation of the character candidates.

Similarly, the default and reversed sequences of the key 203 are respectively "def" and "fed"; the default and reversed sequences of the key 204 are respectively "ghi" and "ihg"; . . . and the default and reversed sequences of the key 209 are respectively "wxyz" and "zyxw". If the default sequence of the key 202 is "abc2" in which a digit "2" follows letter "c", the reversed sequence of the key 202 be obtained as "2cba" by reversing the default sequence, or defined by users as "cba" according to user configuration identified by the processor 10. Character candidates of each key may be stored in an appropriate data structure, such as a linked list or an array, for implementing the default and reversed character traversal and presentation. The addresses of the first and last characters may be stored in registers or the main memory 20 of the electronic device 100.

Figure 5A:
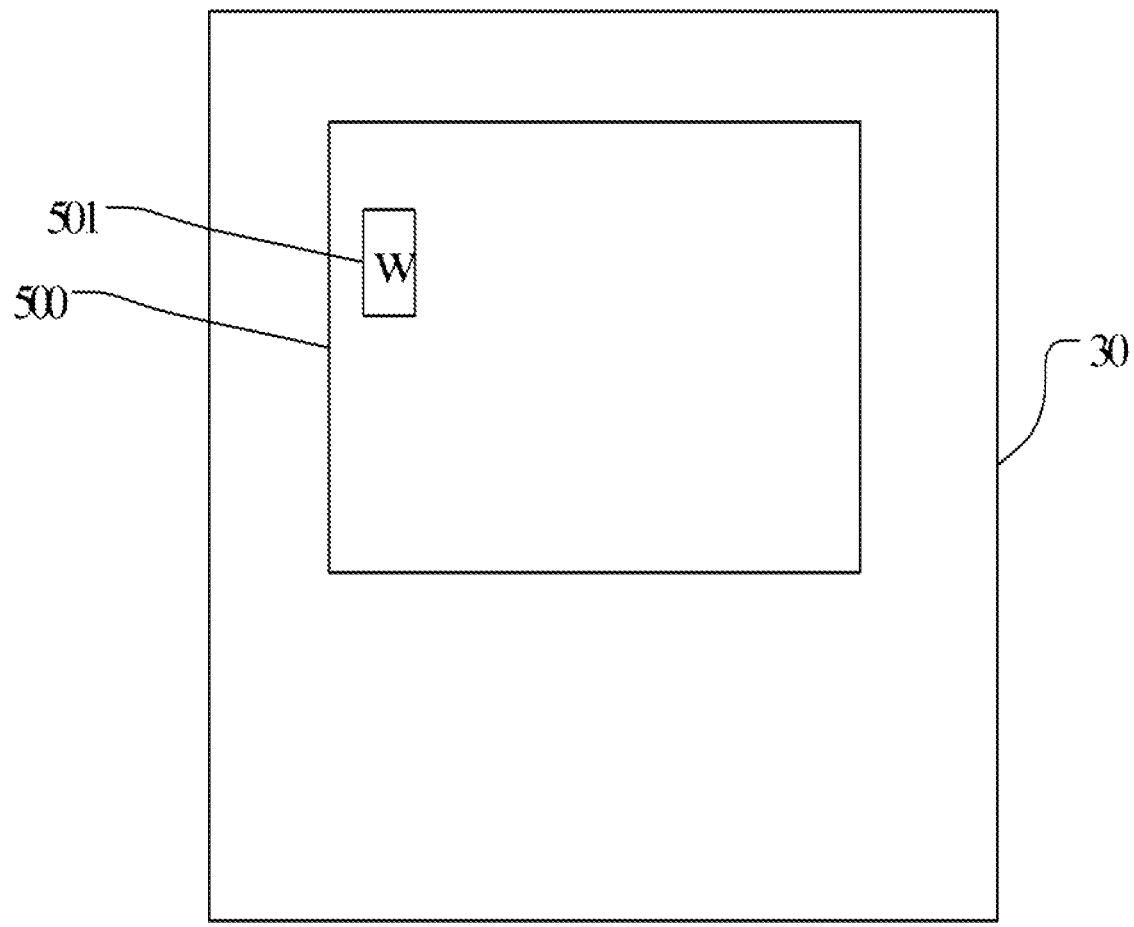
FIGS. 5A-5F are schematic diagrams showing character candidates and a cursor in a text area.

After activating the default sequence of character candidates, the processor 10 displays the first character candidate in the default sequence (step S306). For example, if the key i comprises the key 209, the processor 10 displays the first character "w" in the default sequence "wxyz" corresponding to the key 209. FIG. 5A shows a character candidate "w" indicated by a cursor 501 in a text area 500. The processor 10 initiates the timer 60 to count an operation period of the key i (step S309) and detects occurrence of any subsequent operation on the same key i (event A), expiration of the timer 60 (event B), or any operation on another key (event C) (step S310). Said another key receiving an operation in the step S310 is referred to as a key j, where j is a positive integer, $201 \leq j \leq 212$, and where and $j \neq i$.

Figure 5B:
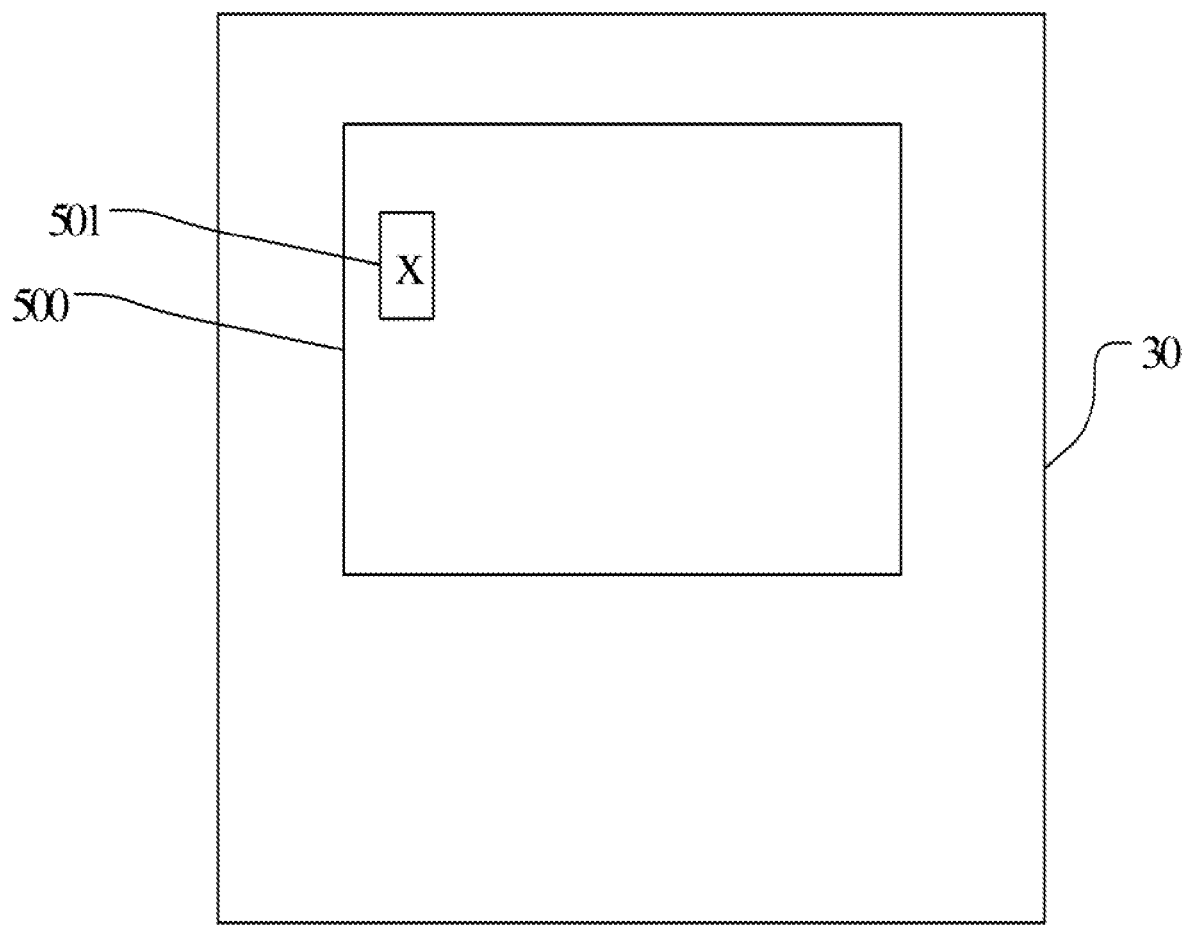

In the step S310, upon receiving a subsequent operation on the same key i (event A), the processor 10 resets the timer 60 (step S312) and displays a next character candidate in the default sequence in substitution for the currently displayed character (step S314). For example, in a case that the key i comprises the key 209, the processor 10 displays a next character candidate "x" in the default sequence "wxyz" as shown in FIG. 5B. The step S310 is repeated. Similarly, upon receiving another subsequent operation on the same key 209, the processor 10 resets the timer 60 and displays a next character candidate "y" in the default sequence "wxyz". The character candidate next to "z" is "w".

Figure 5C:
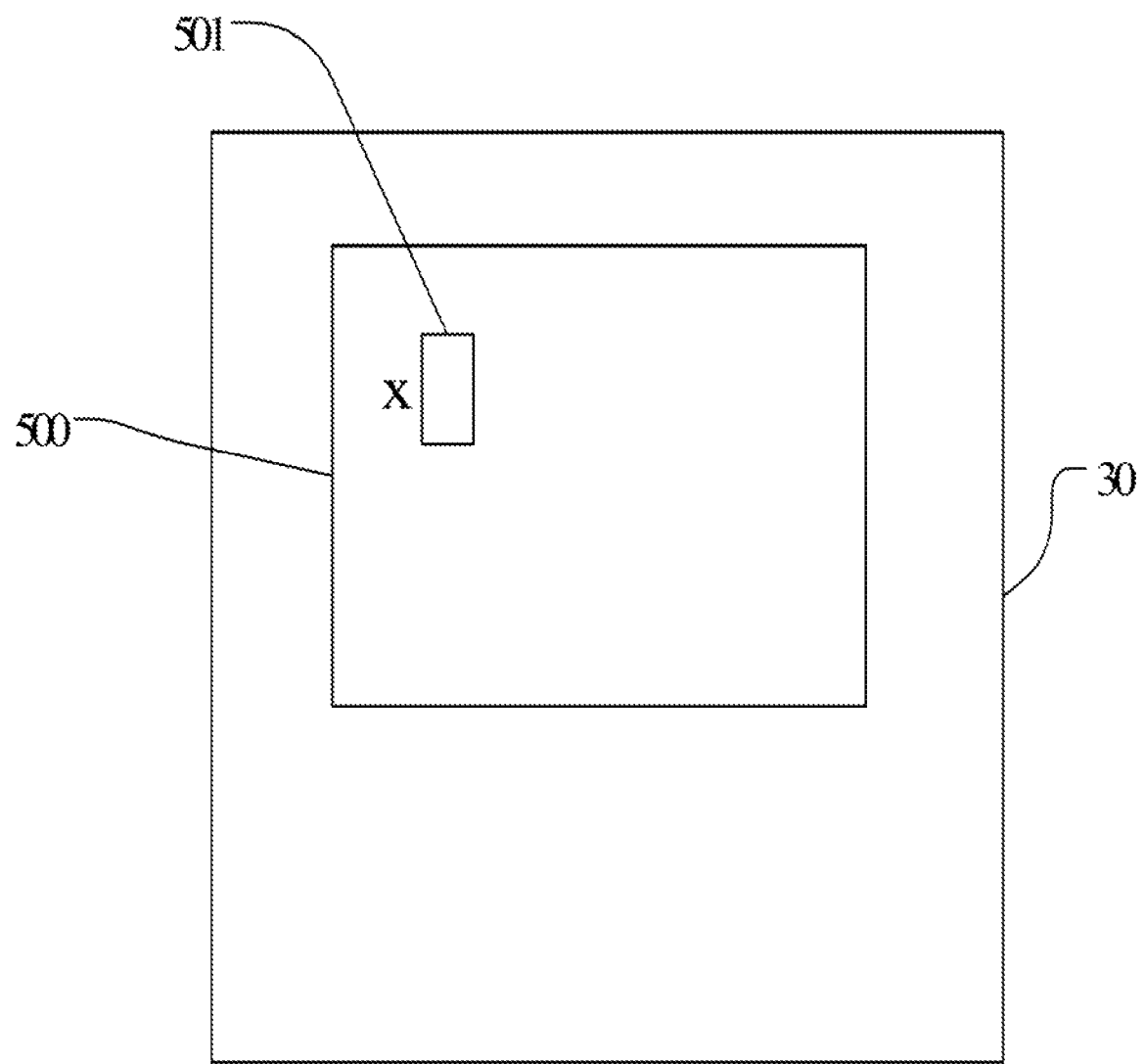

In the step S310, if the timer 60 expires (event B), the processor 10 enters a currently displayed character candidate of the key i to a text area, and moves the cursor to a next position in the text area (step S316). The step S301 is repeated. For example, if "x" is the currently displayed character candidate when the timer 60 expires, as shown in FIG. 5C, the processor 10 enters "x" to the text area 500 and moves the cursor 501 to a next position in the text area 500.

In the step S310, upon receiving an operation on another key j (event C), the processor 10 enters a currently displayed character candidate of the key i to the text area, moves the cursor to a next position in the text area (step S318), and resets the timer 60 for the key j (step S302). The processor 10 repeats steps S305-S310, S312, S314, S316, S318, S325-S328, S332, S334, S336, and S338 following the step S302, thus to present character candidates in a default or reversed sequence for the key j in response to operations on the key k.

Figure 5D:
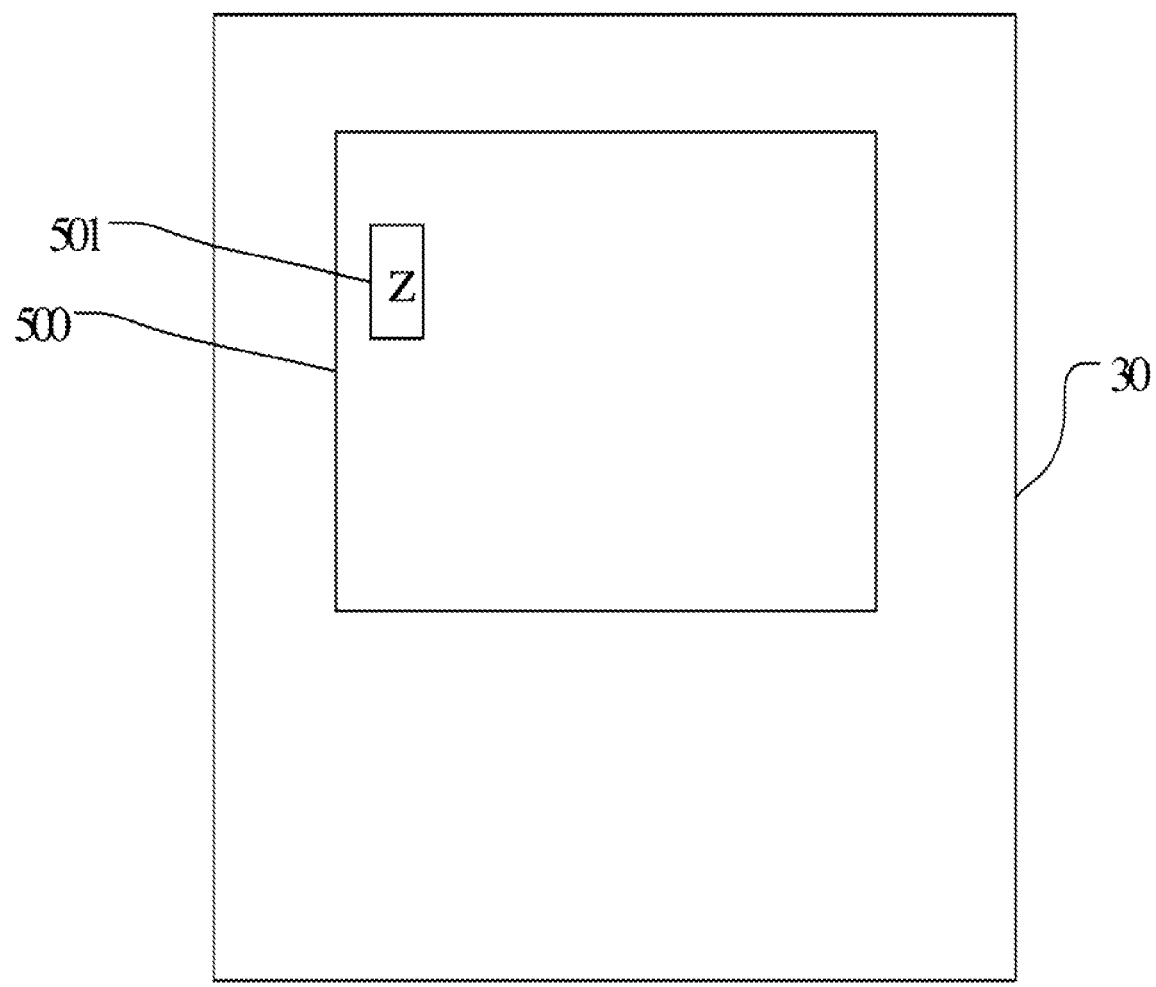

Description is now returned to a reversed sequence. In the step S325, if duration of the performed operation on the key i exceeds time interval t, the performed operation conforms to the second input pattern, and the processor 10 activates a reversed sequence of character candidates for the key i (step S325) and displays the first character candidate in the reversed sequence (step S326). For example, in a case that the key i comprises the key 209, the processor 10 displays the first character candidate "z" in the reversed sequence "zyxw", as shown in FIG. 5D, in which "z" is indicated by the cursor 501. When the performed operation on the key i is terminated (step S327), the processor 10 initiates the timer 60 to count an operation period of the key i (step S328). The processor 10 detects occurrence of any subsequent operation on the same key i (event A), expiration of the timer 60 (event B), or any operation on another key (event C) (step S330). Said another key receives an operation in the step S330, is referred to as a key j.

Figure 5E:
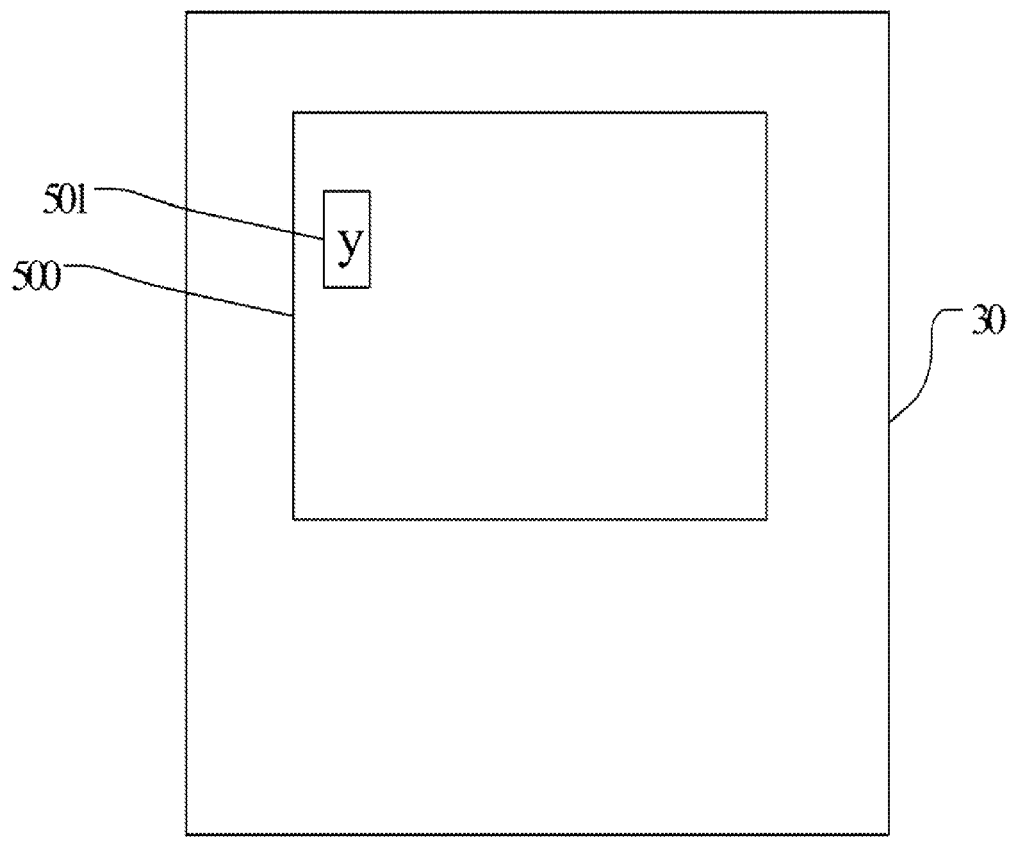

In the step S330, upon receiving a subsequent operation on the same key i (event A), the processor 10 resets the timer 60 (step S332) and displays a next character candidate in the reversed sequence in substitution for the currently displayed character (step S334). For example, in a case that the key i comprises the key 209, the processor 10 displays a next character candidate "y" in the reversed sequence "zyxw" as shown in FIG. 5E. The step S330 is repeated. Similarly, upon receiving another subsequent operation on the same key 209, the processor 10 resets the timer 60 and displays a next character candidate "x" in the reversed sequence "zyxw". The character candidate next to "w" in the reversed sequence is "z".

Figure 5F:
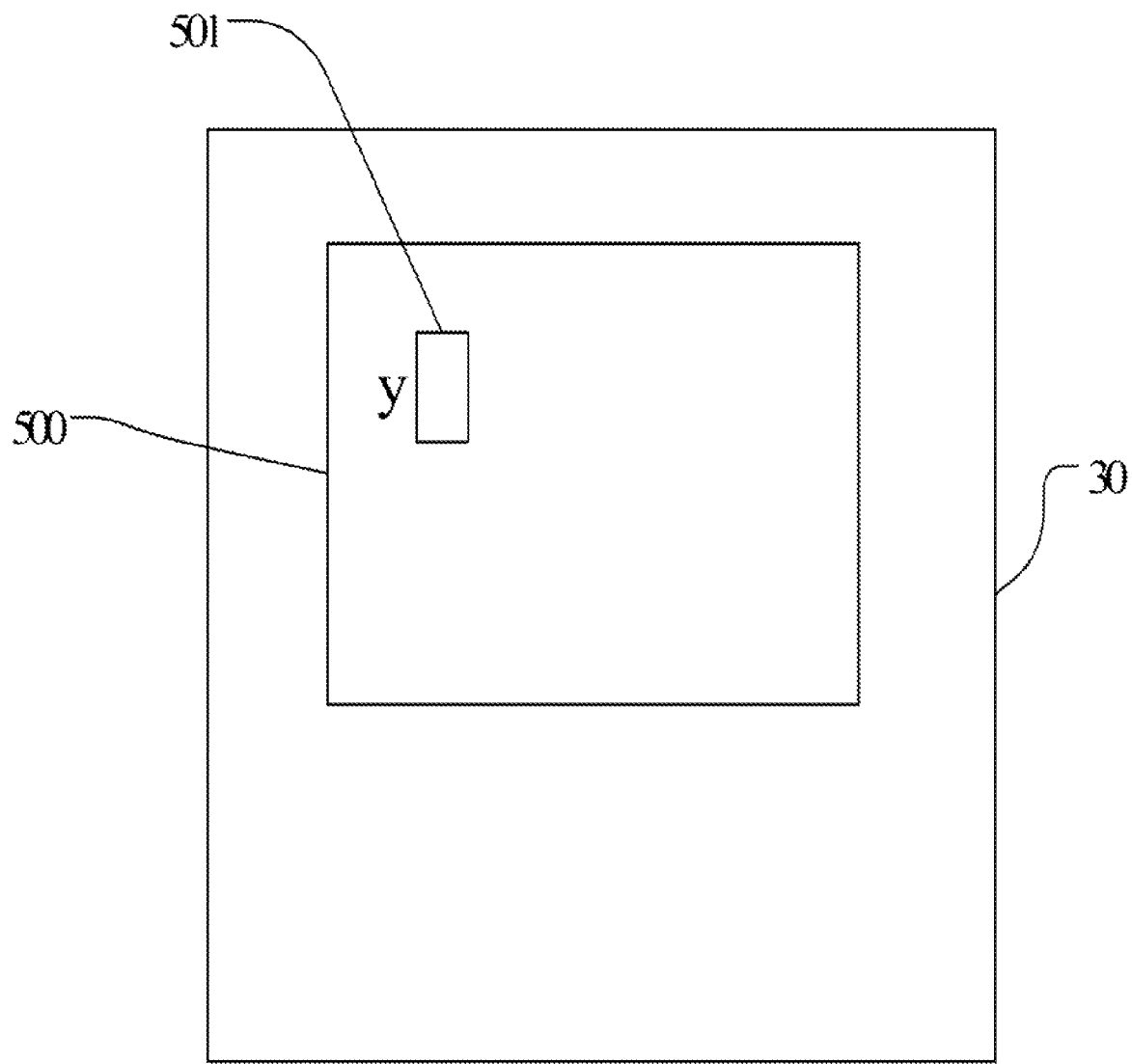

In the step S330, if the timer 60 expires (event B), the processor 10 enters a currently displayed character candidate of the key i to a text area, and moves the cursor to a next position in the text area (step S336). The step S301 is repeated. For example, if "y" is the currently displayed character candidate when the timer 60 expires, as shown in FIG. 5F, the processor 10 enters "y" to the text area 500 and moves the cursor 501 to a next position in the text area 500.

In the step S330, upon receiving an operation on another key j (event C), the processor 10 enters a currently displayed character candidate of the key i to the text area, moves the cursor to a next position in the text area (step S338), and resets the timer 60 for the key j (step S302). The processor 10 repeats steps S305-S310, S312, S314, S316, S318, S325-S328, S332, S334, S336, and S338 following the step S302 for the key j.

Note that the arrangement of steps in the input method may be changed in alternative embodiments of the input method. For example, the step S309 can be performed before the step S305 or S306. Before an operation period of a key expires, a long press on the key can change the route for traversing character candidates during the operation period. Another exemplary embodiment of the input method is given with reference to FIG. 3C.

2.2 Second Exemplary Embodiment of Character Input Method

Figure 3C:
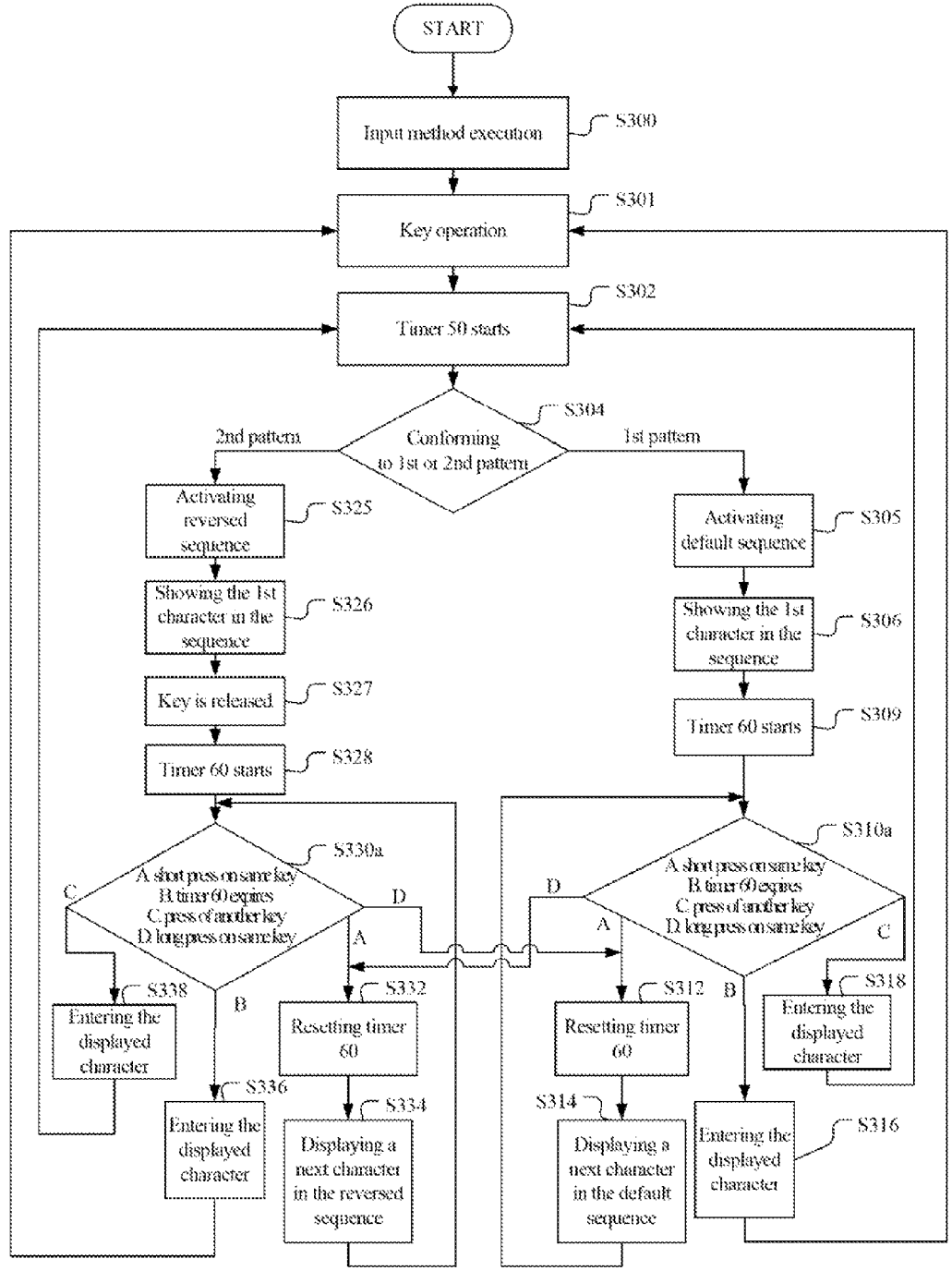
FIG. 3C is flowchart showing another embodiment of a character input method.

With reference to FIG. 3C, the difference between FIG. 3C and FIG. 3B relies on steps S310a and S330a. In the step S310a, the processor 10 detects occurrence of any subsequent short press on the same key i (event A), expiration of operation period of the key i (event B), or any operation on another key j (event C), or any long press on the key i (event D). Upon receiving a short press on the same key i (event A), the processor 10 executes the steps S312 and S314. Upon receiving a long press on the same key i (event D), the processor 10 executes the steps S332 and S334. Specifically, in the step S334, the processor 10 selects the reversed sequence as the preset route and displays a character candidate in the reversed sequence next to the currently displayed character candidate, thus to present one character candidate in the reversed sequence of the key i in response to each operation of the key i before the operation period of the key i expires. For example, in a case that the default sequence of the key 209 is initially activated as the preset route, in response to a long press in the step S310a when character "y" is currently displayed, the processor 1 displays character candidate "x" of the key 209 in step S334, which is the character candidate next to "y" in the reversed sequence of the key 209, or the character candidate previous to "y" in the default sequence of the key 209.

In the step S330a, the processor 10 detects occurrence of any subsequent short press on the same key i (event A), expiration of operation period of the key i (event B), or any operation on another key j (event C), or any long press on the key i (event D). Upon receiving a short press on the same key i (event A), the processor 10 executes the steps S332 and S334. Upon receiving a long press on the same key i (event D), the processor 10 executes the steps S312 and S314. Specifically, in the step S314, the processor 10 selects the default sequence as the preset route and displays a character candidate in the default sequence next to the currently displayed character candidate, thus to present one character candidate in the default sequence of the key i in response to each operation of the key i before the operation period of the key i expires. For example, in a case that the reversed sequence of the key 209 is initially activated as the preset route, in response to a long press in the step S330a when character "y" is currently displayed, the processor 1 displays character candidate "z" of the key 209 in step S314, which is the character candidate next to "y" in the default sequence of the key 209, or the character candidate previous to "y" in the reversed sequence of the key 209.

The exemplary embodiment of the character input method shown in FIG. 3C can repeatedly change the preset route for traversing character candidates of the key i in response to long presses on the key i before expiration of operation period of the key i. Thus, long press operations within an operation period of a key provide the function of returning to a character candidate previous to a currently displayed character candidate in character presentation. It may be understood that a long press operation within an operation period of a key may return the character presentation to a character candidate previous to a currently displayed character candidate without changing settings of the preset route. Additionally, alternative exemplary embodiments of input methods may utilize other schemes to realize presentation of character candidates in a reversed direction.

2.3 Third Exemplary Embodiment of Character Input Method

Figure 3D:
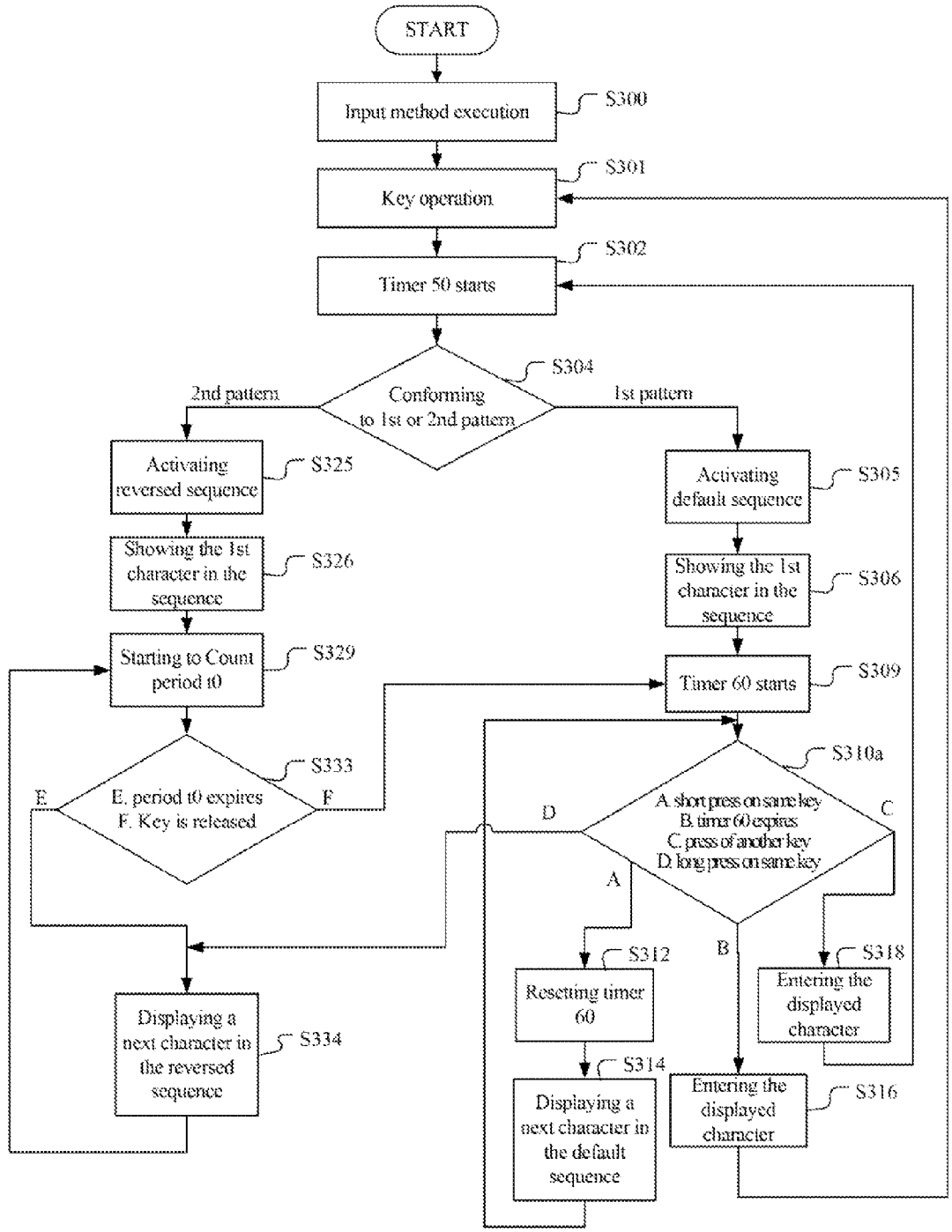
FIG. 3D is flowchart showing another embodiment of a character input method.

With reference to FIG. 3D, difference between FIG. 3D and FIG. 3B is detailed in the following.

In the step S325, if the press operation on the key i continues after the reversed sequence is activated as the preset route, the processor 10 displays the first character candidate in the reversed sequence (step S326), and begins to count an operation period t0 (step S329). The timer 50 or another timer may count the operation period t0. The processor 10 detects expiration of the operation period t0 (event E) or termination of the press operation (event F) (step S333). If the press operation on the key i continues after the operation period t0 expires (event E), the processor 10 displays a next character candidate in the reversed sequence of the key i (step S334). Subsequently, the processor 10 restarts the counting of operation period t0 (step S329) and repeats the step S333. If the press operation terminates (event F), the processor 10 executes the step S309. In the step S316 when the timer 60 expires, the processor 10 enters a currently displayed character candidate.

In the step S310a, the processor 10 detects occurrence of any subsequent short press on the same key i (event A), expiration of operation period of the key i (event B), any operation on another key j (event C), or any long press on the key i (event D). Upon receiving a short press on the same key i (event A), the processor 10 executes the steps S312 and S314. Upon receiving a long press on the same key i (event D), the processor 10 executes the step S334. Specifically, in the step S334, the processor 10 displays a character candidate in the reversed sequence next to the currently displayed character candidate, and may repeat the steps S329, S333, and S334, thus to subsequently present character candidates in the reversed sequence of the key i in response to the long press operation of the key j.

For example, the default and reversed sequences for the key 209 are respectively "wxyz" and "zyxw". In the traditional abc input method, entering "z" in an electronic device requires four press operations on the key 209, and entering "y" to an electronic device requires three press operations on the key 209. The first or second embodiment of the present character input method requires only one press operation on the key 209 to enter "z" to the electronic device 100, and two press operations on the key 209 to enter "y". Thus, the exemplary embodiments of the character input method substantially reduce the number of operations and time required to input a character, and reduce the possibility of missing desired a character during character candidate presentation.

3. Variation of Embodiments

As appreciated, the time interval t is utilized to identify the first and second input patterns. More time intervals may be utilized to identify more input patterns. For example, a press operation on a key with duration less than a time interval t1 is identified as conforming to a first input pattern; a press operation on a key with a duration greater than the time interval t1 but less than a time interval t2 is identified as conforming to a second input pattern; and a press operation on a key with duration greater than the time interval t2 is identified as conforming to a third input pattern.

Figure 6:
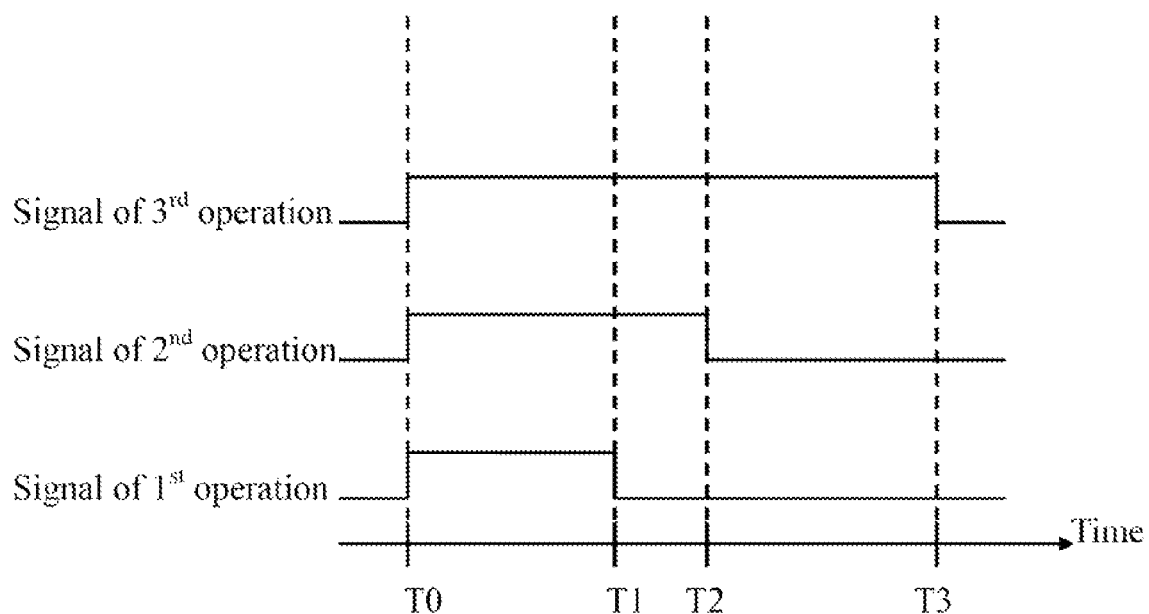
FIG. 6 is a schematic diagram showing operation signals with reference to a time line.

FIG. 6 shows a time line and signals generated from the key i during operation of the key. A high level in each signal waveform in FIG. 6 reflects a pressed state of the key i while a low level reflects a released state of the key i. Operation on the key i may generate different signal waveforms, not limited to FIG. 6. The signal of a first operation shows that the key is pressed at time T0 and released at time T1. If (T1-T0)<t1, the processor 10 determines that the first operation conforms to the first input pattern. If t1≤(T2-T0)<t2, the processor 10 determines that the second operation conforms to the second input pattern. If t2≤(T3-T0), the processor 10 determines that the third operation conforms to the third input pattern. The processor 10 may activate the reversed sequence for the key i in response to an operation conforming to the second input pattern and display a digit corresponding to the key i in response to an operation conforming to the third input pattern.

3.1 Alternative Embodiments of Character Input Method

The processor 10 may display character candidates in a menu on the display 30 to assist character input. Keys in the input unit 40 are classified as text keys and assistant keys. For example, the keys 201-212 are classified as text keys, and keys 213-217 are classified as assistant keys. The key 217 is a direction key and configured for triggering movement of a cursor to the upward, right, downward, and left when activated by a press at positions 218a, 219a, 220a, and 221a, respectively. The key 217 may be replaced by a five direction control means in another embodiment. Description of an alternative embodiment of an input method is given with reference to a keyboard in FIG. 9.

Figure 7:
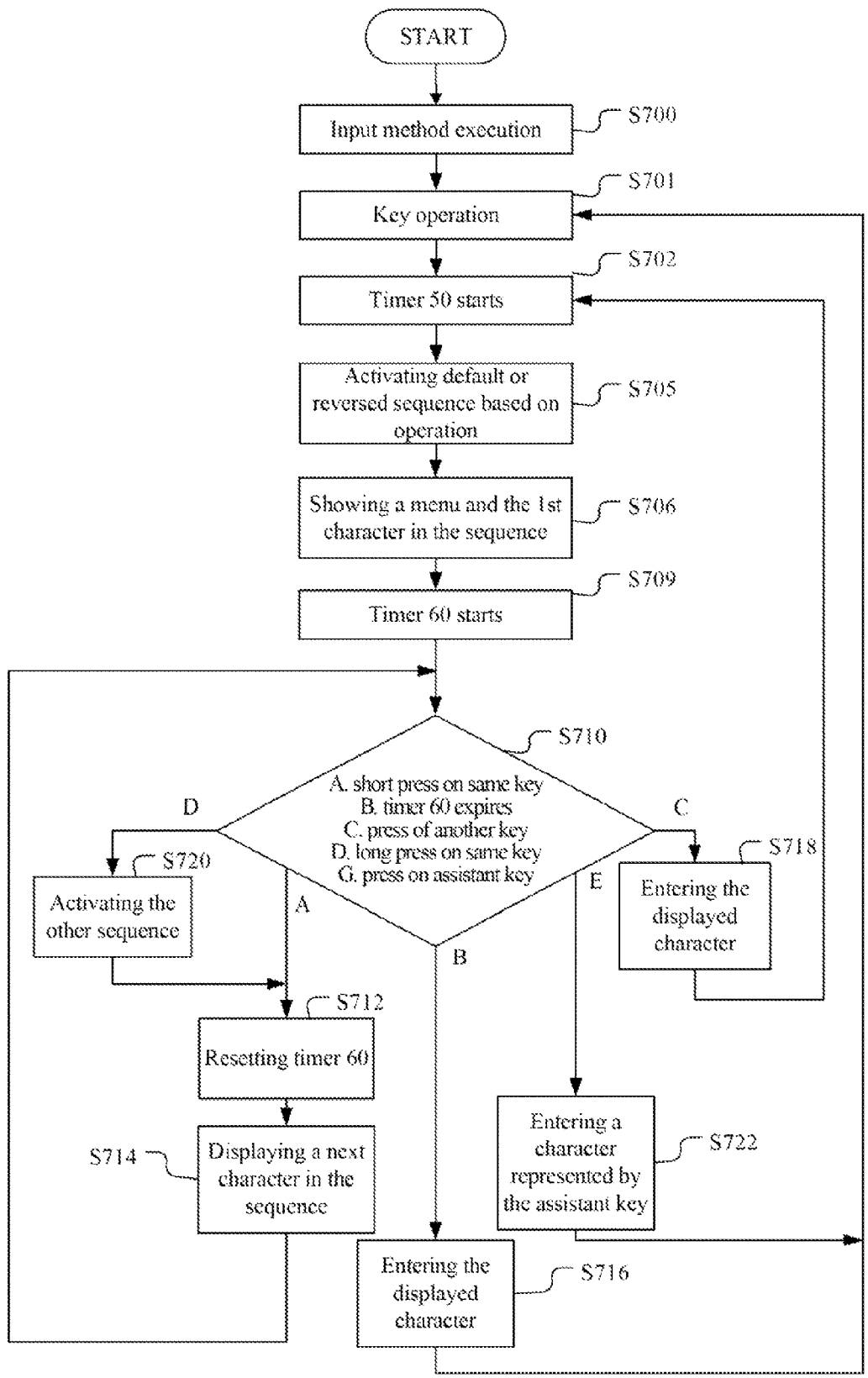
FIG. 7 is flowchart showing another embodiment of a character input method which utilizes a menu to display characters.

With reference to FIG. 7, the processor 10 initiates a character input method (step S700) and determines if a text key (referred to as the key i) in the input unit 40 is activated by an operation (step S701). Upon detecting that an operation activates a text key i, the processor 10 initiates the timer 50 to count an operation period of the key i (step S702) and activate one of the default and reversed sequence of the key i as the preset route based on whether the operation conforms to the first input pattern or the second input pattern (step S705). After the one of the default and reversed sequence is activated, the processor 10 displays a menu on the display 30 and the first character candidate in the activated sequence (step S706) and initiates the timer 60 to count an operation period of the key i (step S709).

In an example that the key i is the key 209, a menu 800 corresponding to an activated default sequence of the key 209 is shown in 8A. Character candidates are arranged clockwise in the menu 800. Character candidates of a key, however, are not limited to FIG. 8A, and can be arranged counterclockwise or in any other arrangement. When the first character candidate "w" of the key 209 is shown in the text area 500, a cursor 801 indicates that "w" is a currently displayed character in the menu 800. The assistant keys 218, 219, 220, and 221 respectively correspond to character candidates "w", "x", "y", and "z".

Figure 9:
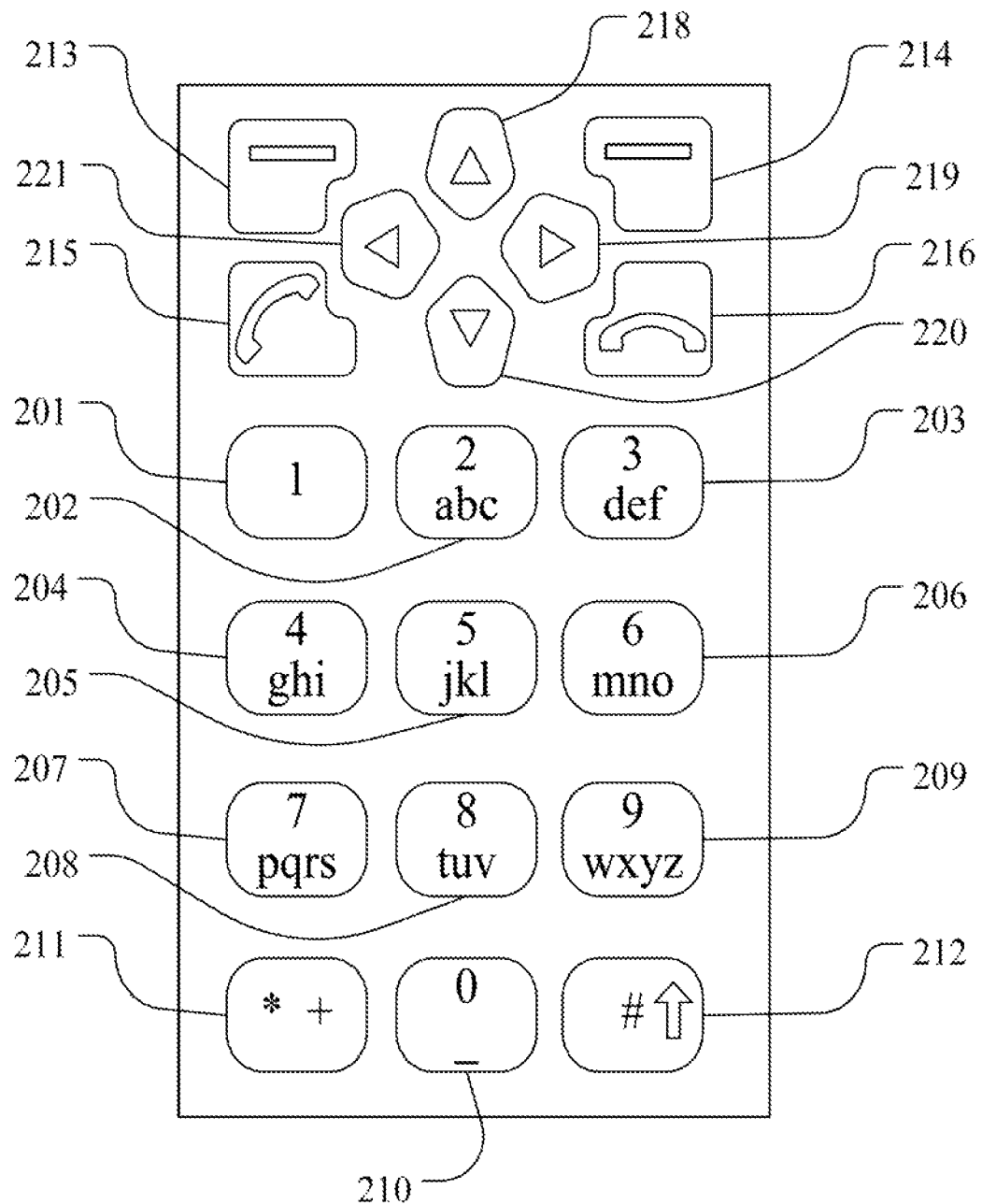
FIG. 9 is a schematic diagram of another embodiment of a keyboard.

The processor 10 detects occurrence of any subsequent short press on the same key i (event A), expiration of operation period of the key i signified by the timer 60 (event B), or any operation on another text key j (event C), or any long press on the key i (event D), or any operation on an assistant key k (event G), where k is an positive integer. In the example of FIG. 9, the range of k is 213≤k≤221.

Figure 8A:
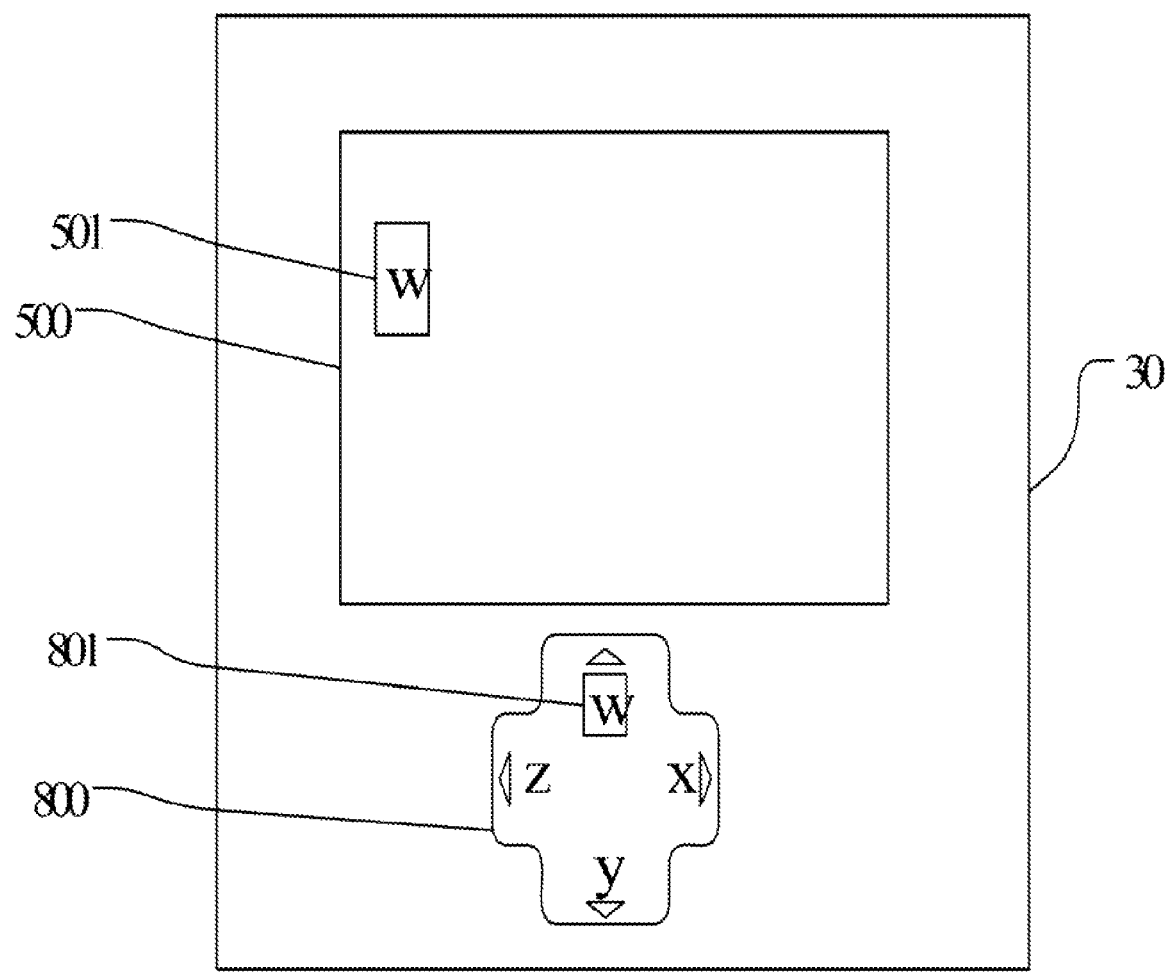
FIG. 8A is a schematic diagram showing a menu corresponding to a default sequence of character candidates "wxyz"
Figure 8B:
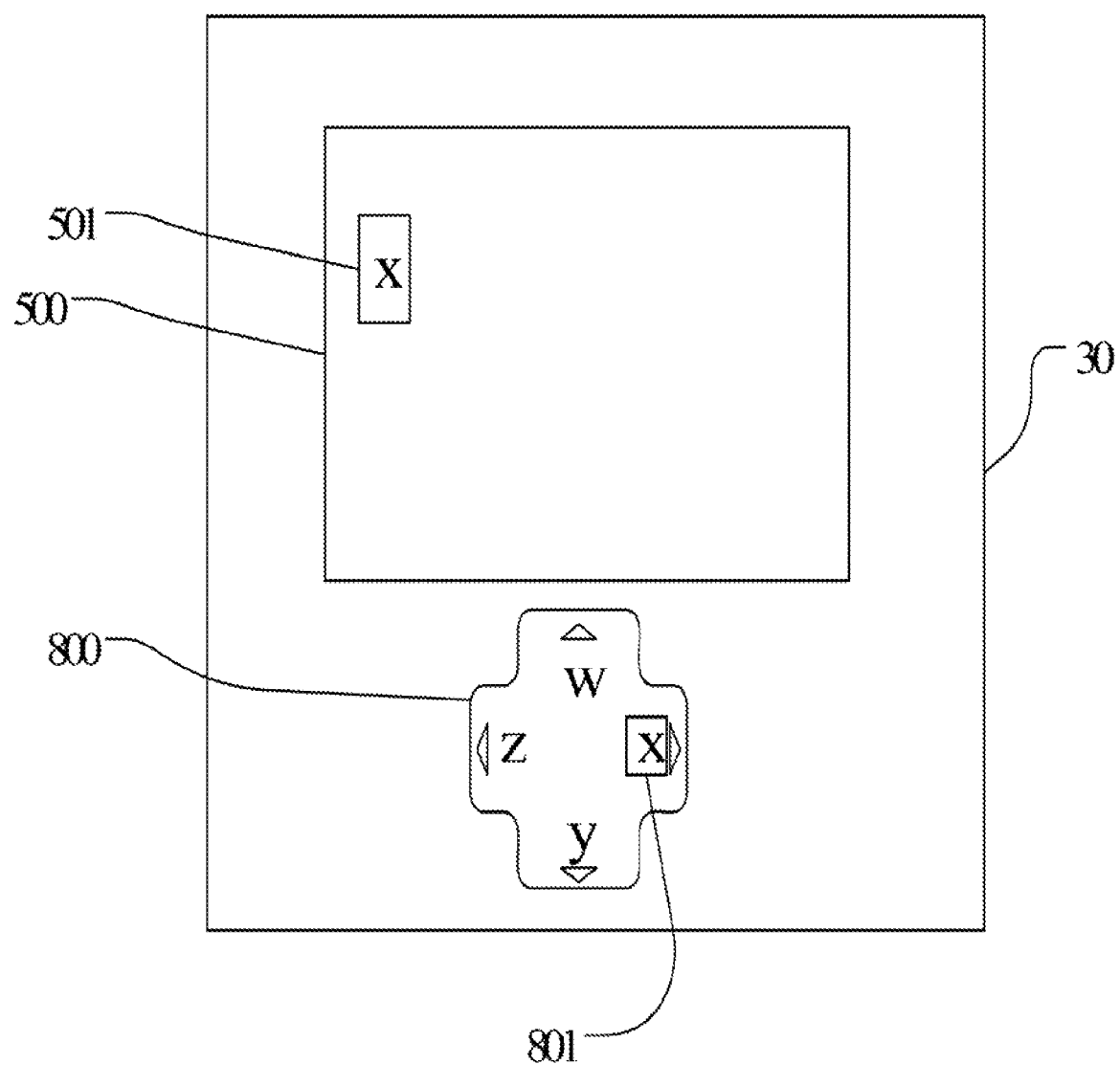
FIG. 8B is a schematic diagram of a text area in which a character "x" in the default sequence "wxyz" is displayed.

In the step S710, upon receiving a short press on the same key i (event A), the processor 10 resets the timer 60 (step S712) and displays a next character candidate in the sequence (step S714). For example, in a case that the key i comprises the key 209, following FIG. 8A, the processor 10 displays a next character candidate "x" in the default sequence "wxyz" as shown in FIG. 8B. The cursor 801 in the menu 800 also moves clockwise to the position of "x" to indicate the currently displayed character. The step S710 is repeated. Similarly, upon receiving a short press on the same key 209 (event A), the processor 10 resets the timer 60, and displays a next character candidate "y" in the default sequence "wxyz". The cursor 801 in the menu 800 also moves clockwise to the position of "y" to indicate the currently displayed character.

Figure 8C:
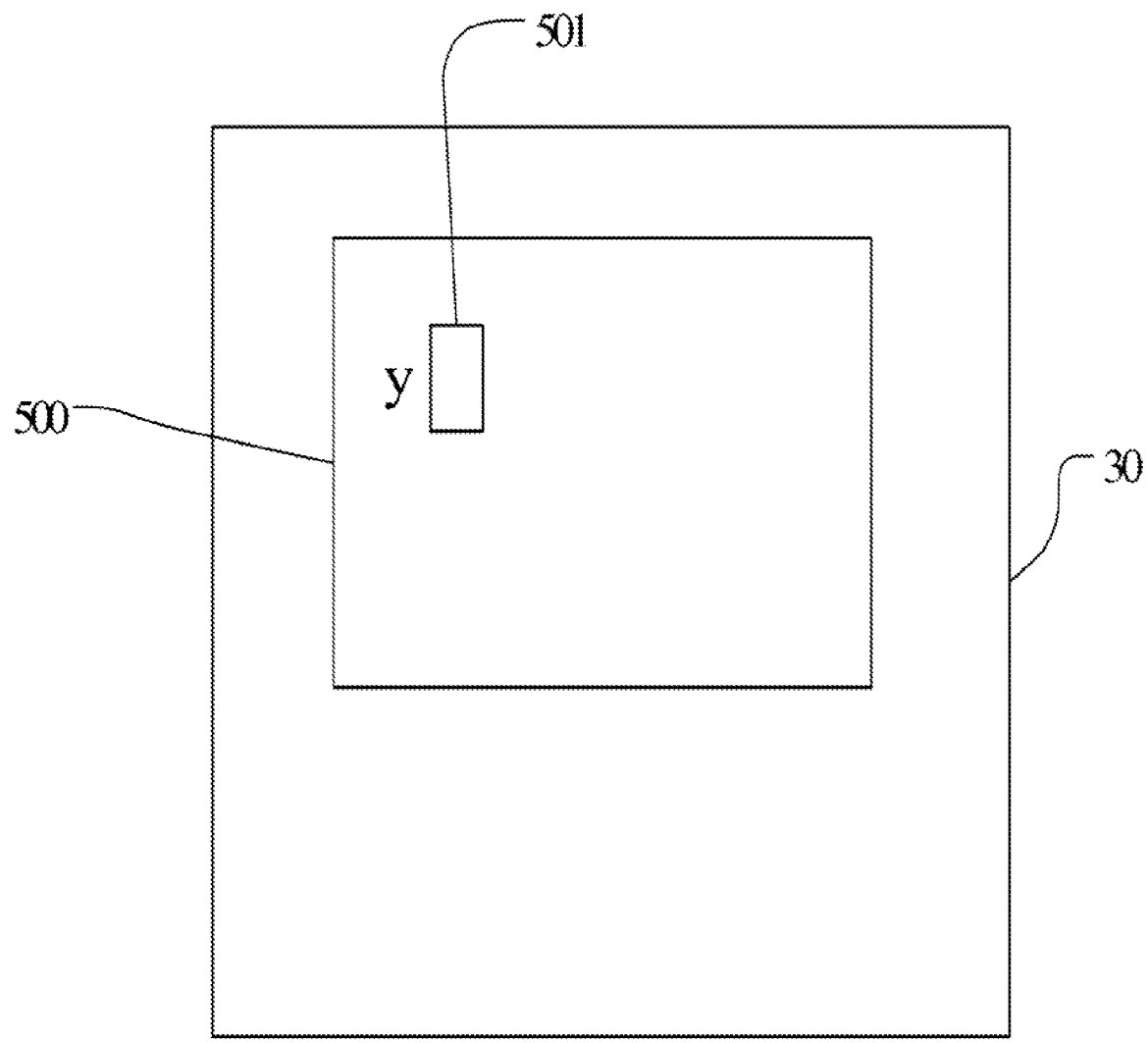
FIG. 8C is a schematic diagram of a text area into which a character "y" is entered.

In the step S710, if the timer 60 expires (event B), the processor 10 enters a currently displayed character candidate of the key i to a text area, and moves the cursor to a next position in the text area (step S716). The step S701 is repeated. For example, if "y" is the currently displayed character candidate when the timer 60 expires, as shown in FIG. 8C, the processor 10 enters "y" to the text area 500, moves the cursor 501 to a next position in the text area 500, and terminates presentation of the menu 800.

In the step S710, upon receiving an operation on another text key j (event C), the processor 10 enters a currently displayed character candidate of the key i to the text area, moves the cursor to a next position in the text area (step S718), and resets the timer 50 for the key j (step S702). The processor 10 repeats steps S705, S706, S709, S710, S712, S714, S716, S718, S720, and S722 following the step S702 for the key j.

In the step S710, upon receiving a long press on the same key i (event D), the processor 10 activate a sequence reverse to the activated sequence before the step S720. For example, if the reversed sequence of the key i is utilized as the preset route in the step S710, the processor 10 activates the default sequence of the key i as the preset route. On the other hand, if the default sequence of the key i is utilized as the preset route in the step S710, the processor 10 activates the reversed sequence of the key i as the preset route. Subsequently, in the step S714, the processor 10 displays a next character candidate in the activated sequence. In the example of FIG. 8A when the default sequence of the key 209 is activated as the preset route, upon receiving a long press on the same key 209 (event D), the processor 10 displays a character "z" previous to "w" in the default sequence "wxyz", i.e. the character candidate next to "w" in the reversed sequence, and moves the cursor 801 clockwise to the position of "z" to indicate the currently displayed character. The step S710 is repeated. Similarly, upon receiving a subsequent long press on the same key 209 (event D), the processor 10 resets the timer 60, displays a character "y" next to "z" in the reversed sequence, and moves the cursor 801 clockwise to the position of "y" to indicate the currently displayed character. FIGS. 3C and 3D shows that a long press can change the preset route of character candidates. Route for traversing character candidates, however, can be controlled by various input devices, such as a dialer, a wheel, a rotatable knob, or a touch panel. The processor 10 may perform clockwise or counterclockwise movement of the cursor 801 and the currently displayed character in response to clockwise or counterclockwise tracks detected by the touch panel. The display 30 can be equipped with a touch panel to form a touch screen. The keyboard in FIG. 9 can be a virtual keyboard displayed on the display 30.

In the step S710, upon receiving an operation on an assistant key k (event G), the processor 10 enter a character candidate corresponding to the key k to a text area, moves a cursor to a next position in the text area (step S722), and repeats steps S701, S702, S705, S706, S709, S710, S712, S714, S716, S718, S720, and S722 following the step S700. Following the example of FIG. 8A, in FIG. 8C, the processor 10 enters character "y" to the text area 500 in response to an operation on the key 220 disregarding the currently displayed. In the example of FIG. 8A, entering of character "y" to a text area requires two operations no matter in the default sequence or reversed sequence before expiration of the timer 60. With the aid of assistant keys, only one operation is required to enter the character "y" to a text area. Similarly, the processor enters character "w", "x", or "z" to the text area 500 in response to an operation on the key 218, 219, or 221. Character candidates of the key 209 can be input to electronic device 100 through the five schemes corresponding to events A, B, C, D, and G during execution of one input method with no confliction exist between these schemes.

Figure 8D:
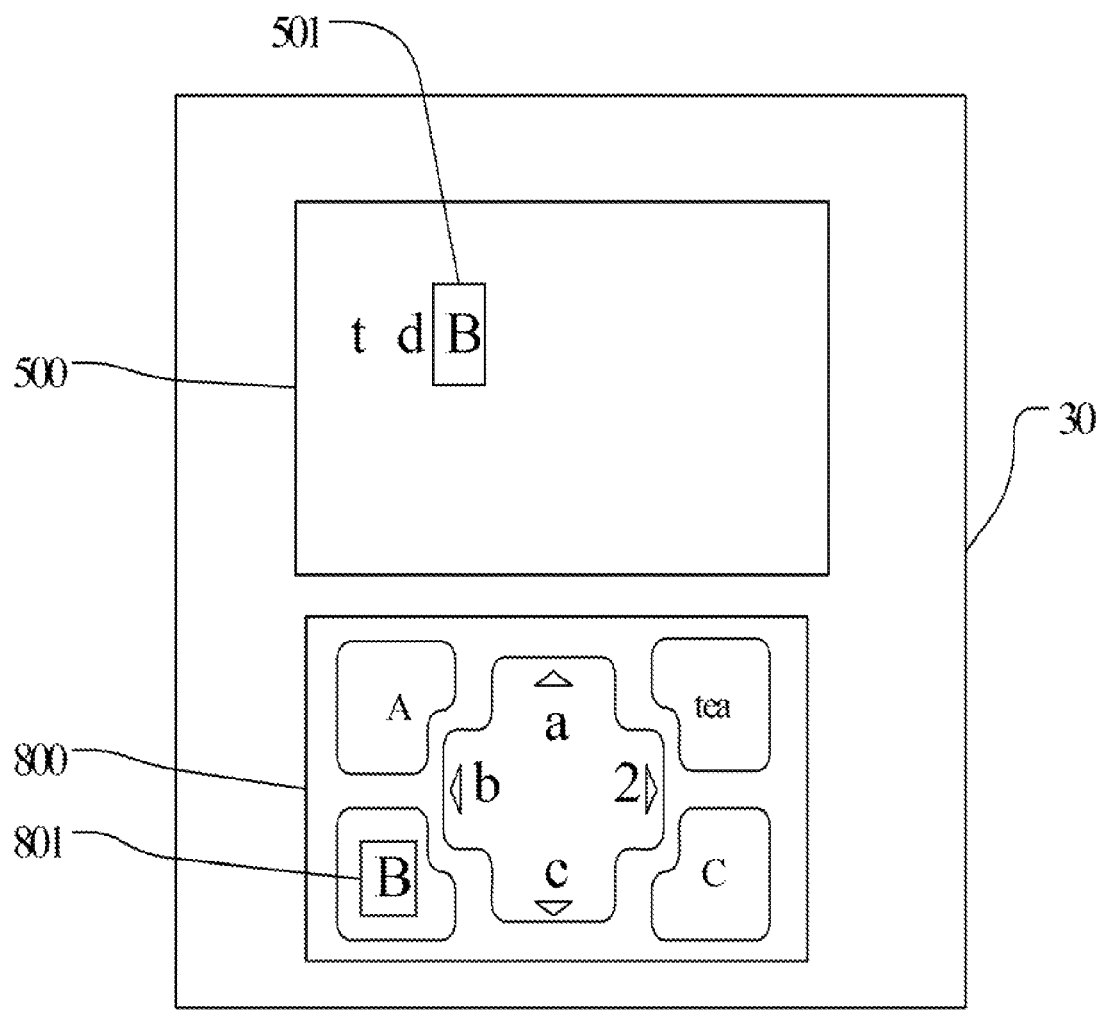
FIG. 8D is a schematic diagram showing another embodiment of a menu in which character candidates are represented by assistant keys.

The menu 800 can include more candidates for a key, such as uppercase and lowercase letters, and auto-completed words. In addition to the direction key 217, voice commands or other keys can be utilized to represent character candidates in the menu 800. As shown in FIG. 8D, when the key 202 receives an operation, assistant keys 213, 214, 215, 216, 218, 219, 220, and 221 respectively represent "A", "tea", "B", "C", "a", "2", "c", and "b". The "tea" is an auto-completed word, which is determined by the processor 10 from input characters in front of the cursor 501 in the text area 500 and character candidates in the menu 800. For example, characters in front of the cursor 501 comprise "t" and "d". Character candidates of the key 208 associated with the character "t" are "t", "u", and "v". Character candidates of the key 203 associated with the character "d" are "d", "e", and "f". The processor 10 selects the first letter in the auto-completed word from "t", "u", or "v", the second letter in the auto-completed word from "d", "e", and "f", and the last letter in the auto-completed word from the menu 800. The processor 10 may select an auto-completed word according to those words, which are most frequently input by users of the electronic device 100, or based on a dictionary database in the electronic device 100. The auto-completed word in the menu 800 may be generated according to T9® input method.

3.2 Alternative Embodiments of the Electronic Device

The exemplary embodiments of the character input method can be executed in various systems, such as electronic device systems shown in FIG. 10-12.

In FIG. 10, a processor 11 of an electronic device 101 executes the character candidates input method, and a communication unit 17 transmits text to a communication unit 27 through communication channel 104. A processor 21 displays the text received by the communication unit 27 on a display 32 and enters the text into a text area of an electronic device 102. The communication channel 14 in FIG. 10 may transfer text message and control signals between the electronic devices 101 and 102.

In FIG. 11, a communication unit 17 of an electronic device 201 transmits input signals generated by an input unit 41 to communication unit 27 through communication channel 204. A processor 21 in the electronic device 202 displays character candidates on a display 32 and enters the character candidates to a text area under the direction of the character input method based on input signals received by the communication unit 27. The electronic device 202 may display the text on an external display.

In FIG. 12, a communication unit 17 of an electronic device 301 transmits input signals generated by an input unit 41 to communication unit 27 through communication channel 304. A processor 21 in the electronic device 202 performs the character input method based on input signals received by the communication unit 27 and transmits generated characters to a communication unit 28. The communication unit 28 transmits the characters to a communication unit 37 through a communication channel 305. An electronic device 303 characters the text received by the communication unit 37 on a display 33.

The communication channels 104, 204, 304, and 305 may be wire-lined or wireless channels. Each of the electronic devices 101, 201, and 301 may be a remote control or portable device, such as a PDA, an ultra mobile device (UMD), a laptop computer, or a cell phone. Each of the electronic devices 102, 202, and 303 may comprise a television or a media player, such as a disc player. The electronic device 302 may comprise a set-top box. The main memory 2 and 22 in FIGS. 10-12 may store computer-readable program for implementing the character input method.

4. Conclusion

The described embodiments of the character input method can be utilized to input characters of various languages, such as Hiragana and Katakana of Japanese, or phonetic symbols of Chinese. Other means such as highlighted color or size, rather than a cursor as described, can be utilized to indicate a currently display character candidate.

In conclusion, the character input method activates default or reversed sequence of character candidates in response to different operations on the same key and utilizes a menu to assist character input. The character input method reduces the number of operations and time required for character input, and thus eliminates the possibility of mis-operation. The character input method is adoptable with and not conflicting with the traditional abc input method. Execution of the character input method does not restrict device user to learn new input schemes but provides to device user options of character input with less keystrokes.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device, comprising:
a touch sensitive device operable to detect one or more touch operations based on one or more keys of a virtual keyboard displayable by a display function of the electronic device; and
a processor electronically connected to the touch sensitive device and operable to present character information on a display, and operable to detect operation of a key of the touch sensitive device according to a character input method, the character input method comprising:
displaying the virtual keyboard comprising a plurality of keys through the display function, wherein each key of the plurality of keys is operable as a toggle key, two different keys in the plurality of keys are respectively associated with different sequences of character candidates, and a sequence of character candidates comprises optional characters arranged in a specific arrangement for character input to a text area;
receiving a first operation on a first key among the plurality of keys of the virtual keyboard;
displaying by the electronic device a first graphical user interface component operable to present a sequence of character candidates associated with the first key, wherein the presented sequence of character candidates is arranged in a first arrangement in the first graphical user interface component along a specific direction;
presenting a first character in the presented sequence of character candidates associated with the first key as a currently selected character in response to a first instance of a short press operation on the first key in a condition that the first operation comprises the short press operation conforming to a first input pattern;
presenting a first subsequent character in the presented sequence of character candidates associated with the first key as the currently selected character in response to a second instance of the short press operation on the first key conforming to the first input pattern after the first instance of the short press operation; and
displaying a second graphical user interface component operable to present the sequence of character candidates associated with the first key in response to a second operation conforming to a second input pattern, wherein the presented sequence of character candidates is arranged in a second arrangement in the second graphical user interface component along the specific direction, at least two characters in the sequence of character candidates associated with the first key in the first arrangement are reversed in the second arrangement, and the currently selected character is operable to be input to the text area of the electronic device.

2. The electronic device as claimed in claim 1, wherein the character input method further comprises:
presenting a second subsequent character in the presented sequence of character candidates associated with the first key in the second graphical user interface component as the currently selected character according to an arrangement of character traversal for traversing characters in the sequence of character candidates associated with the first key in response to a third operation based on the first key, wherein the arrangement of character traversal is different from the first arrangement.

3. The electronic device as claimed in claim 2, wherein the character input method further comprises:
displaying a plurality of assistant keys, wherein each assistant key of the plurality of assistant keys is associated with a character candidate in the sequence of character candidates associated with the first key in the second graphical user interface component; and
entering a character candidate associated with a first assistant key to the text area of the electronic device in a condition that the third operation comprises a press on the first assistant key.

4. The electronic device as claimed in claim 2, wherein the character input method further comprises:
presenting the second subsequent character in the presented sequence of character candidates associated with the first key in the second graphical user interface component as the currently selected character in response to a touch track based on the first key in a condition that the third operation comprises the touch track based on the first key detectable by the touch sensitive device of the electronic device, and the touch track comprises a first touch track or a second touch track.

5. The electronic device as claimed in claim 4, wherein the first operation initiates an operation period of the first key, the first touch track comprises a touch track during the operation period of the first key, one character candidate associated with the first key is selectable as the currently selected character in response to one or more operations based on the first key during the operation period of the first key, and the currently selected character is input to the text area upon expiration of the operation period.

6. The electronic device as claimed in claim 4, wherein the first touch track and the second touch track respectively comprise touch movements in different directions.

7. The electronic device as claimed in claim 4, wherein a focus in the second graphical user interface component operable to represent the currently selected character moves from a second character candidate to third character candidate, and movement of the focus reflects directions of the touch track comprised in the third operation even if the touch track comprised in the third operation is separated from the second graphical user interface component.

8. The electronic device as claimed in claim 7, wherein the first touch track and the second touch track respectively comprise clockwise and counterclockwise touch movements on the touch sensitive device, the second graphical user interface component comprises a prior character and a post character posterior to the prior character in the second arrangement, and the character input method further comprises:

selecting, during presentation of the prior character as the currently selected character, the post character as the currently selected character in substitution for the prior character in response to the first touch track, wherein the selecting of the post character as the currently selected character by the first touch track is performed even if the first touch track detectable by the touch sensitive device is separated from an area representing the post character in the second graphical user interface component; and
selecting, during presentation of the post character as the currently selected character, the prior character as the currently selected character in substitution for the post character in response to the second touch track, wherein the selecting of the prior character as the currently selected character by the second touch track is performed even if the second touch track detectable by the touch sensitive device is separated from an area representing the prior character in the second graphical user interface component.

9. The electronic device as claimed in claim 2, wherein each key of the plurality of keys is operable to be toggled between a pressed state and a released state, the plurality of keys are arranged as an electronically displayable virtual keyboard, and the first key is switchable between the pressed state and the released state and is not transitioned to a specialized state beyond toggling of the first key between the pressed state and the released state in response to any or all of the first operation, the second operation, the third operation, the first instance and the second instance of the short press operation on the first key.

10. The electronic device as claimed in claim 1, wherein the second operation comprises an operation the duration of which is counted from the first operation.

11. The electronic device as claimed in claim 1, wherein the second operation comprises a long press on the first key conforming to a second input pattern.

12. The electronic device as claimed in claim 11, wherein the first input pattern represents a default input scheme of short press on the first key operable to select one character candidate associated with the first key as the currently selected character according to the first arrangement, a duration of the short press is less than a predetermined time interval, the second input pattern represents an alternative input scheme of long press on the first key operable to select one character candidate associated with the first key as the currently selected character, and a duration of the long press is greater than the predetermined time interval.

13. The electronic device as claimed in claim 1, wherein the sequence of character candidates associated with the first key comprise at least three characters of letters or at least three characters of two letters and one digit.

14. The electronic device as claimed in claim 1, wherein the second graphical user interface component comprises a menu.

15. An electronic device, comprising:
a touch sensitive device operable to detect one or more touch operations based on one or more keys of a virtual keyboard displayable by a display function of the electronic device;
a processor electronically connected to the touch sensitive device and operable to present character information on a display, and operable to detect operation of a key of the touch sensitive device according to a character input method, the character input method comprising:
displaying the virtual keyboard comprising a plurality of keys through the display function, wherein each key of the plurality of keys is operable as a toggle key, two different keys in the plurality of keys are respectively associated with different sequences of character candidates, and a sequence of character candidates comprises optional characters arranged in a specific arrangement for character input to a text area;

receiving a first operation on a first key among the plurality of keys of the virtual keyboard, wherein the first operation initiates an operation period of the first key;

wherein one character candidate associated with the first key is selectable as a currently selected character in response to one or more operations based on the first key during the operation period of the first key, the operation period is extendable by one or more operations based on the first key, and the currently selected character is input to the text area of the electronic device upon expiration of the operation period; and cycling a first sequence of character candidates associated with the first key according to a first arrangement of characters in the first sequence of character candidates to present a character candidate in the first sequence of character candidates as the currently selected character in response to each of instances of a short press on the first key conforming to a first input pattern during the operation period of the first key, wherein the cycling comprises:

presenting a first character in the first sequence of character candidates as the currently selected character according to the first arrangement in response to a first instance of the short press on the first key in a condition that the first operation comprises the first instance of the short press conforming to the first input pattern; and presenting a first subsequent character in the first sequence of character candidates as the currently selected character according to the first arrangement in response to a second instance of the short press on the first key conforming to the first input pattern after the first instance of the short press; and the character input method further comprising:

displaying a first graphical user interface component operable to present the first sequence of character candidates associated with the first key during the operation period, wherein the first graphical user interface component allows selection of a second subsequent character candidate in the first sequence of character candidates as the currently selected character according to a second arrangement of character traversal different from the first arrangement in response to a third operation based on the first key conforming to a second input pattern, and the first graphical user interface component allows the third operation to terminate the operation period of the first key;

allowing a third instance of the short press on the first key to resume the cycling of the first sequence of character candidates according to the first arrangement after displaying of the first graphical user interface component; and entering the currently selected character to the text area of the electronic device upon expiration of the operation period.

16. The electronic device as claimed in claim 15, wherein the third operation based on the first key conforming to a second input pattern comprises a touch operation, and the character input method further comprises:

displaying a plurality of assistant keys, wherein each assistant key of the plurality of assistant keys is associated with a character candidate in the first sequence of character candidates associated with the first key in the first graphical user interface component, and the third operation based on the first key conforming to a second input pattern comprises a touch operation on a second assistant key associated with a second subsequent character candidate; and entering the second subsequent character candidate associated with the second assistant key to the text area of the electronic device in a condition that the third operation comprises a press on the second assistant key.

17. The electronic device as claimed in claim 15, wherein the third operation comprises a touch track based on the first key detectable by the touch sensitive device of the electronic device, and the touch track comprises a first touch track or a second touch track.

18. The electronic device as claimed in claim 17, wherein the first touch track and the second touch track respectively comprise touch movements in different directions, a focus in the first graphical user interface component operable to represent the currently selected character moves from a second character candidate to a third character candidate, and movement of the focus reflects directions of the touch track comprised in the third operation even if the touch track comprised in the third operation is separated from the first graphical user interface component.

19. The electronic device as claimed in claim 18, wherein the first touch track and the second touch track respectively comprise clockwise and counterclockwise touch movements on the touch sensitive device, the first graphical user interface component comprises a prior character and a post character posterior to the prior character in the second arrangement, and the character input method further comprises:

selecting, during presentation of the prior character as the currently selected character, the post character as the currently selected character in substitution for the prior character in response to the first touch track, wherein the selecting of the post character as the currently selected character by the first touch track is performed even if the first touch track detectable by the touch sensitive device is separated from an area representing the post character in the first graphical user interface component; and selecting, during presentation of the post character as the currently selected character, the prior character as the currently selected character in substitution for the post character in response to the second touch track, wherein the selecting of the prior character as the currently selected character by the second touch track is performed even if the second touch track detectable by the touch sensitive device is separated from an area representing the prior character in the first graphical user interface component.

20. The electronic device as claimed in claim 15, wherein the character input method further comprises:

displaying the first graphical user interface component in response to a second operation based on the first key conforming to a third input pattern, wherein the second operation comprises an instance of a long press on the first key, and the second operation comprises an operation the duration of which is counted from the first operation.

21. The electronic device as claimed in claim 20, wherein the first input pattern represents a default input scheme of the short press on the first key operable to select one character candidate associated with the first key as the currently selected character according to the first arrangement, a duration of the short press is less than a predetermined time interval, the third input pattern represents an alternative input scheme of the long press on the first key operable to select one character candidate associated with the first key as the currently selected character, and a duration of the long press is greater than the predetermined time interval.

22. The electronic device as claimed in claim 20, wherein the character input method further comprises:
   associating the first key with a second sequence of character candidates to alter an arrangement of presenting character candidates associated with the first key in response to a fourth operation based on the first key conforming to the third input pattern before expiration of the operation period of the first key.

23. The electronic device as claimed in claim 15, wherein the character input method further comprises:
   displaying by the electronic device a second graphical user interface component operable to present the first sequence of character candidates associated with the first key, wherein the presented first sequence of character candidates is arranged in the first arrangement in the second graphical user interface component along a specific direction; and
   displaying the first graphical user interface component operable to present the first sequence of character candidates associated with the first key in response to a second operation based on the first key conforming to a third input pattern before expiration of the operation period, wherein character candidates in the first sequence of character candidates are arranged in a third arrangement in the first graphical user interface component along the specific direction, and at least two characters in the first sequence of character candidates associated with the first key in the first arrangement are reversed in the third arrangement.

24. The electronic device as claimed in claim 15, wherein the first sequence of character candidates associated with the first key comprises at least three characters of letters or at least three characters of two letters and one digit.

25. The electronic device as claimed in claim 15, wherein each key of the plurality of keys is operable to be toggled between a pressed state and a released state, the plurality of keys are arranged as an electronically displayable virtual keyboard, and the first key is switchable between the pressed state and the released state and is not transitioned to a specialized state beyond toggling of the first key between the pressed state and the released state in response to any or all of the first operation, the third operation, the first instance of the short press, the second instance of the short press, and the third instance of the short press.

26. The electronic device as claimed in claim 15, wherein the first graphical user interface component comprises a menu.

27. An electronic device, comprising:
   a touch sensitive device operable to detect one or more touch operations based on one or more keys of a virtual keyboard displayable by a display function of the electronic device;
   a processor electronically connected to the touch sensitive device and operable to present character information on a display, and operable to detect operation of a key of the touch sensitive device according to a character input method, the character input method comprising:
   displaying the virtual keyboard comprising a plurality of keys through the display function, wherein each key of the plurality of keys is operable as a toggle key, two different keys in the plurality of keys are respectively associated with different sequences of character candidates, and a sequence of character candidates comprises optional characters arranged in a specific arrangement for character input to a text area;
   receiving a first operation on a first key among the plurality of keys of the virtual keyboard;
   wherein one character candidate associated with the first key is selectable as a currently selected character in response to one or more operations based on the first key during an operation period of the first key, the operation period is extendable by one or more operations based on the first key, the currently selected character is input to the text area of the electronic device upon expiration of the operation period, and the first key is associated with a first sequence of character candidates;
   presenting a first character in the first sequence of character candidates as the currently selected character according to a first arrangement of characters in the first sequence of character candidates in response to a first instance of a short press on the first key in a condition that the first operation comprises the first instance of the short press;
   displaying a first graphical user interface component operable to present the first sequence of character candidates associated with the first key during the operation period, wherein the first graphical user interface component comprises a focus operable to indicate the currently selected character;
   receiving and classifying a touch movement in a two-dimensional domain detectable by the touch sensitive device of the electronic device into an operation of a forward direction or an operation of a backward direction of the first graphical user interface component according to a direction of the touch movement detectable by the touch sensitive device during the operation period;
   wherein the first graphical user interface component allows a forward movement of the focus in the first sequence of character candidates in response to the operation of the forward direction and a backward movement of the focus in the first sequence of character candidates in response to the operation of the backward direction;
   wherein the first sequence of character candidates comprises a first optional character, a second optional character, and a third optional character arranged in order, in a condition that the focus indicates the second optional character as the currently selected character, in the forward movement the focus moves from the second optional character to the third optional character to indicate the third optional character as the currently selected character in substitution for the second optional character, and in the backward movement the focus moves from the second optional character to the first optional character to indicate the first optional character as the currently selected character in substitution for the second optional character; and
   entering the currently selected character to the text area of the electronic device upon expiration of the operation period.

28. The electronic device as claimed in claim 27, wherein the first graphical user interface component allows the forward movement and the backward movement of the focus even if the touch movement is separated from the first graphical user interface component.

29. The electronic device as claimed in claim 27, wherein the direction of the touch movement comprises a clockwise direction or a counterclockwise direction.

30. The electronic device as claimed in claim 27, wherein the first graphical user interface component is displayed in response to an instance of a long press on the first key during the operation period.

31. The electronic device as claimed in claim 30, wherein the short press on the first key represents a default input scheme operable to select one character candidate associated with the first key as the currently selected character according to the first arrangement, a duration of the short press is less than a predetermined time interval, the long press on the first key represents an alternative input scheme operable to select one character candidate associated with the first key as the currently selected character, and a duration of the long press is greater than the predetermined time interval.

32. The electronic device as claimed in claim 30, wherein the character input method further comprises:
   associating the first key with a second sequence of character candidates to alter an arrangement of presenting character candidates associated with the first key in response to the instance of a long press based on the first key before expiration of the operation period of the first key.

33. The electronic device as claimed in claim 27, wherein the character input method further comprises:
   displaying a second graphical user interface component operable to present the first sequence of character candidates, wherein the presented first sequence of character candidates is arranged in the first arrangement in the second graphical user interface component along a specific direction; and
   displaying the first graphical user interface component operable to present the first sequence of character candidates associated with the first key in response to an instance of a long press on the first key before expiration of the operation period, wherein character candidates in the first sequence of character candidates are arranged in a second arrangement in the first graphical user interface component along the specific direction, and at least two characters in the first sequence of character candidates associated with the first key in the first arrangement are reversed in the second arrangement.

34. The electronic device as claimed in claim 27, wherein each key of the plurality of keys is operable to be toggled between a pressed state and a released state, the plurality of keys are arranged as an electronically displayable virtual keyboard, and the first key is switchable between the pressed state and the released state and is not transitioned to a specialized state beyond toggling of the first key between the pressed state and the released state in response to any or all of the instance of the short press and the touch movement.

35. The electronic device as claimed in claim 27, wherein the first graphical user interface component comprises a menu.

36. The electronic device as claimed in claim 35, wherein character candidates of the first sequence are arranged linearly in the menu or scattered in a two-dimensional layout in an area of the menu.

37. The electronic device as claimed in claim 35, wherein the menu has at least one character candidate of the first sequence in each of four corners of the menu.

* * * * *